(12) United States Patent
Nigam et al.

(10) Patent No.: US 12,339,832 B2
(45) Date of Patent: Jun. 24, 2025

(54) SYSTEMS AND METHODS FOR USER ALIAS CORRECTION

(71) Applicant: KnowBe4, Inc., Clearwater, FL (US)

(72) Inventors: Paras Nigam, Bangalore (IN); Atish Kathpal, Bangalore (IN); Sandeep Balagopal, Kochi (IN)

(73) Assignee: KnowBe4, Inc.

( * ) Notice: Subject to any disclaimer, the term of this patent is extended or adjusted under 35 U.S.C. 154(b) by 0 days.

(21) Appl. No.: 18/432,389

(22) Filed: Feb. 5, 2024

(65) Prior Publication Data

US 2024/0281430 A1 Aug. 22, 2024

Related U.S. Application Data

(60) Provisional application No. 63/491,645, filed on Mar. 22, 2023.

(51) Int. Cl.
- *G06F 7/00* (2006.01)
- *G06F 16/23* (2019.01)
- *G06Q 10/10* (2023.01)

(52) U.S. Cl.
CPC ......... *G06F 16/2365* (2019.01); *G06Q 10/10* (2013.01)

(58) Field of Classification Search
CPC ........................... G06F 16/2365; G06Q 10/10
USPC .................................................. 707/600–899
See application file for complete search history.

(56) References Cited

U.S. PATENT DOCUMENTS

| | | | |
|---|---|---|---|
| 8,615,807 B1 | 12/2013 | Higbee et al. | |
| 8,635,703 B1 | 1/2014 | Belani et al. | |
| 8,719,940 B1 | 5/2014 | Higbee et al. | |
| 8,910,287 B1 | 12/2014 | Belani et al. | |
| 8,966,637 B2 | 2/2015 | Belani et al. | |
| 9,053,326 B2 | 6/2015 | Higbee et al. | |
| 9,246,936 B1 | 1/2016 | Belani et al. | |
| 9,253,207 B2 | 2/2016 | Higbee et al. | |
| 9,262,629 B2 | 2/2016 | Belani et al. | |
| 9,325,730 B2 | 4/2016 | Higbee et al. | |
| 9,356,948 B2 | 5/2016 | Higbee et al. | |
| 9,398,038 B2 | 7/2016 | Higbee et al. | |
| 9,591,017 B1 | 3/2017 | Higbee et al. | |
| 9,667,645 B1 | 5/2017 | Belani et al. | |
| 9,912,687 B1 | 3/2018 | Wescoe et al. | |
| 10,904,186 B1 | 1/2021 | Everton et al. | |

(Continued)

FOREIGN PATENT DOCUMENTS

| | | |
|---|---|---|
| EP | 3 582 468 A1 | 12/2019 |
| WO | WO-2016/164844 A1 | 10/2016 |

*Primary Examiner* — Isaac M Woo

(74) *Attorney, Agent, or Firm* — Foley & Lardner LLP

(57) ABSTRACT

Described herein are systems and methods for correcting one or more user aliases. One or more alias identifiers are identified by type based at least on one or more user aliases stored in an alias store, the one or more user aliases mapping the one or more alias identifiers to one or more users. Each of the one or more alias identifiers are assigned to one or more rules of a same type as the one or more alias identifiers. The one or more rules are executed against one or more user records in a user metadata store to establish a results table identifying one or more aliases by type found in the user metadata store. An alias correction table is established that identifies one or more aliases of the results table that do not match one or more user aliases and to one of flag, remove, or correct.

22 Claims, 22 Drawing Sheets

(56) References Cited

U.S. PATENT DOCUMENTS

| | | |
|---|---|---|
| 10,986,122 B2 | 4/2021 | Bloxham et al. |
| 11,044,267 B2 | 6/2021 | Jakobsson et al. |
| 11,184,393 B1 | 11/2021 | Gendre et al. |
| 11,297,094 B2 | 4/2022 | Huda |
| 2007/0100868 A1* | 5/2007 | Hackmann ............ G06F 16/252 707/999.102 |
| 2016/0164898 A1 | 6/2016 | Belani et al. |
| 2016/0301705 A1 | 10/2016 | Higbee et al. |
| 2019/0173819 A1 | 6/2019 | Wescoe et al. |
| 2019/0245885 A1 | 8/2019 | Starink et al. |
| 2020/0311260 A1 | 10/2020 | Klonowski et al. |
| 2021/0185075 A1 | 6/2021 | Adams |
| 2021/0194924 A1 | 6/2021 | Heinemeyer et al. |
| 2022/0078207 A1 | 3/2022 | Chang et al. |
| 2022/0094702 A1 | 3/2022 | Saad Ahmed et al. |
| 2022/0100332 A1 | 3/2022 | Haworth et al. |
| 2022/0116419 A1 | 4/2022 | Kelm et al. |
| 2022/0130274 A1 | 4/2022 | Krishna Raju et al. |
| 2022/0286419 A1 | 9/2022 | Stetzer et al. |

\* cited by examiner

400

Security Event Identifiers
IP = 192.169.3.29
WLAN MAC = FC:08:4A:65:C6:12
email_username = abaker
hostname= ABC.com

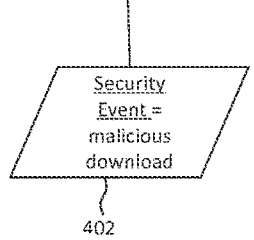

Security Event = malicious download
402

| Alias Store | |
|---|---|
| IP Address | User |
| 192.169.67.123 | John Smith |
| 192.169.3.29 | Alice Baker |
| ... | ... |
| 192.51.99.255 | Philip Jones |
| WLAN MAC Address | User |
| 38:E8:DF:01:4D:A9 | John Smith |
| FC:08:4A:65:C6:12 | Alice Baker |
| ... | ... |
| EC:79:49:E0:18:77 | Philip Jones |
| Email Username | User |
| jsmith | John Smith |
| abaker | Alice Baker |
| ... | ... |
| pjones | Philip Jones |

404

Mapping Results
IP → Alice Baker
WLAN MAC → Alice Baker
email_username → Alice Baker
hostname → no match
406

410

Security Actions
Pop up notification
Mandatory training module
Temporary external network access block Malicious download → Alice Baker
408

| Alias Store | |
|---|---|
| IP Address | User |
| 192.169.67.123 | John Smith |
| 192.169.3.29 | Alice Baker |
| ... | ... |
| 192.51.99.255 | Philip Jones |
| *192.185.22.231* | *John Smith* |
| | |
| WLAN MAC Address | User |
| 38:E8:DF:01:4D:A9 | John Smith |
| FC:08:4A:65:C6:12 | Alice Baker |
| ... | ... |
| EC:79:49:E0:18:77 | Philip Jones |
| | |
| Email Username | User |
| jsmith | John Smith |
| abaker | Alice Baker |
| ... | ... |
| pjones | Philip Jones |

702 → (points to row 192.185.22.231 / John Smith)

| User Metadata Store | |
|---|---|
| IP Address | User |
| 192.185.22.231 | John Smith |
| 192.169.3.29 | Alice Baker |
| ... | ... |
| 192.51.99.255 | Philip Jones |
| | |
| WLAN MAC Address | User |
| FC:08:4A:36:B9:04 | John Smith |
| FC:08:4A:65:C6:12 | Alice Baker |
| ... | ... |
| 38:E8:DF:01:4D:A9 | Philip Jones |
| | |
| Email Username | User |
| jsmith | John Smith |
| abaker | Alice Baker |
| ... | ... |
| pjones | Philip Jones |

902 → FC:08:4A:36:B9:04 John Smith
904 → 38:E8:DF:01:4D:A9 Philip Jones

SYSTEMS AND METHODS FOR USER ALIAS CORRECTION

RELATED APPLICATION

This application claims the benefit of and priority to each of U.S. Provisional Application No. 63/491,645 titled "SYSTEMS AND METHODS FOR USER ALIAS CORRECTION" and filed Mar. 22, 2023, and Indian Application No. 202321007348 titled "SYSTEMS AND METHODS FOR USER ALIAS CORRECTION" and dated Feb. 6, 2023, all of which are incorporated herein by reference for all purposes.

FIELD OF DISCLOSURE

This disclosure relates to security awareness management. In particular, the present disclosure relates to systems and methods for user alias correction.

BACKGROUND OF THE DISCLOSURE

Cybersecurity incidents cost companies millions of dollars each year in actual costs and can cause customers to lose trust in an organization. The incidents of cybersecurity attacks and the costs of mitigating the damage are increasing every year. Many organizations use cybersecurity tools such as antivirus, anti-ransomware, anti-phishing, and other quarantine platforms to detect and intercept known cybersecurity attacks. However, new, and unknown security threats involving social engineering may not be readily detectable by such cyber security tools, and the organizations may have to rely on their employees (referred to as users) to recognize such threats. To enable their users to stop or reduce the rate of cybersecurity incidents, the organizations may conduct security awareness training for their users. The organizations may conduct security awareness training through in-house cybersecurity teams or may use third parties which are experts in matters of cybersecurity. The security awareness training may include cybersecurity awareness training, for example, via simulated phishing attacks, computer-based training, and other training programs. Through security awareness training, organizations educate their users on how to detect and report suspected phishing communication, avoid clicking on malicious links, and use applications and websites safely. Security awareness training is most impactful when it is personalized and targeted to a user and the user's behavior. A risk score may be established for a user, where the risk score represents how likely the user is to be targeted with a phishing or social engineering attack, how the user will react to targeted attacks, and how secure the user's behavior is when using systems and devices in the organization and on the organization's networks.

BRIEF SUMMARY OF THE DISCLOSURE

Systems and methods are provided for correcting one or more user aliases. In an example embodiment, a method for correcting one or more user aliases is described. The method includes identifying one or more alias identifiers by type based at least on one or more user aliases stored in an alias store, the one or more user aliases mapping the one or more alias identifiers to one or more users. In some embodiments, the method includes assigning each of the one or more alias identifiers to one or more rules of a same type as the one or more alias identifiers and executing the one or more rules against one or more user records in a user metadata store. In some embodiments, the method includes establishing a results table as a result of execution of the one or more rules, the results table identifying one or more aliases by type found in the user metadata store and establishing an alias correction table responsive to applying the results table against the alias store, the alias correction table identifying one or more aliases of the results table that do not match one or more user aliases. In some embodiments, the method includes providing the alias correction table to identify the one or more user aliases in the alias store to one of flag, remove, or correct.

In some embodiments, the method includes automatically setting a rejected equals true flag, using the alias correction table, for the identified one or more user aliases in the alias store.

In some embodiments, the method includes displaying the alias correction table to a system administrator via a user interface from which the system administrator can take action to one of flag, remove, or correct the one or more aliases in the alias store.

In some embodiments, the type of alias identifiers comprises one or more of the following: internet protocol (IP) address, media access control (MAC) address, or email username.

In some embodiments, the type of rule comprises one or more of the following: IP address, MAC address, or email username.

In some embodiments, the rule comprises a security event identifier that corresponds to the type of rule.

In some embodiments, the rule has a left-hand-side of the rule that comprises the security event identifier and a right-hand-side of the rule that comprises user metadata.

In some embodiments, the method includes using a trie structure for matching one or more strings in one or more rules to one or more user records.

In some embodiments, the method includes establishing the trie structure per rule type for an organization.

In some embodiments, the method includes establishing the trie structure for multiple organizations by incorporating an organization identifier as part of the trie structure.

In some embodiments, the method includes tracking a number of user aliases that are one of flagged, removed, or corrected and if the number exceeds a threshold, cause display of a prompt to a system administrator to take action.

In another example embodiment, a system for correcting one or more user aliases is described. The system is configured to identify one or more alias identifiers by type based at least on one or more user aliases stored in an alias store, the one or more user aliases mapping the one or more alias identifiers to one or more users. In some embodiments, the system is configured to assign each of the one or more alias identifiers to one or more rules of a same type as the one or more alias identifiers, to execute the one or more rules against one or more user records in a user metadata store, and to establish a results table as a result of execution of the one or more rules, the results table identifying one or more aliases by type found in the user metadata store. In some embodiments, the system is configured to establish an alias correction table responsive to applying the results table against the alias store, the alias correction table identifying one or more aliases of the results table that do not match one or more user aliases, and provide the alias correction table to identify the one or more user aliases in the alias store to one of flag, remove, or correct.

In another example embodiment, the system is configured to automatically correct, using the alias correction table, the one or more user aliases in the alias store. In some embodiments, the system is configured to display the alias correction table to a system administrator via a user interface from which the system administrator can take action to correct the one or more aliases in the alias store. In some embodiments, the system is configured to use a trie structure for matching one or more strings in one or more rules to one or more user records. In embodiments, the system is configured to establish the trie structure per rule type for an organization. In embodiments, the system is configured to track a number of user aliases that are one of flagged, removed, or corrected and if the number exceeds a threshold, cause display of a prompt to a system administrator to take action.

Other aspects and advantages of the disclosure will become apparent from the following detailed description, taken in conjunction with the accompanying drawings, which illustrate by way of example, the principles of the disclosure.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 4 illustrates a flow diagram of a successful security event mapping by an alias engine, according to some embodiments;

FIG. 7 illustrates an example of addition of a new user alias by a rules engine to an alias store, according to some embodiments;

FIG. 9 illustrates an example of updated user metadata store, according to some embodiments;

DETAILED DESCRIPTION

For purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods that are useful for correcting one or more user aliases.

A. Computing and Network Environment

Figure 1A:
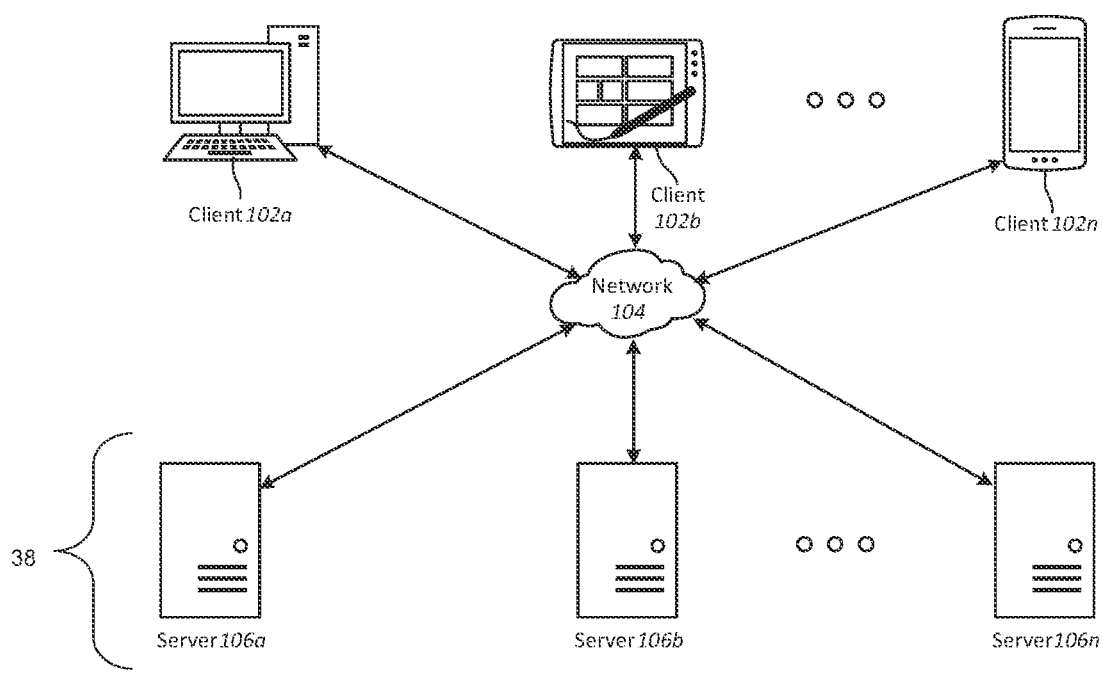
FIG. 1A is a block diagram depicting an embodiment of a network environment comprising client device in communication with server device.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In a brief overview, the network environment includes one or more clients 102a-102n (also generally referred to as local machines(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node(s) 106, machine(s) 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' may be a public network. In still another of these embodiments, networks 104 and 104' may both be private networks.

The network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel, or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1×RTT, CDMA-EVDO, LTE, LTE-Advanced, LTE-M1, and Narrowband IoT (NB-IoT). Wireless standards may use various channel access methods, e.g., FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the Internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP Internet protocol suite may include application layer, transport layer, Internet layer (including, e.g., IPv4 and IPv6), or the link layer. The network 104 may be a type of broadcast network, a telecommunications network, a data communication network, or a computer network.

In some embodiments, the system may include multiple, logically grouped servers 106. In one of these embodiments, the logical group of servers may be referred to as a server farm or a machine farm. In another of these embodiments, the servers 106 may be geographically dispersed. In other embodiments, a machine farm may be administered as a single entity. In still other embodiments, the machine farm includes a plurality of machine farms. The servers 106 within each machine farm can be heterogeneous—one or more of the servers 106 or machines 106 can operate according to one type of operating system platform (e.g., Windows, manufactured by Microsoft Corp. of Redmond, Washington), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In this embodiment, consolidating the servers 106 in this way may improve system manageability, data security, the physical security of the system, and system performance by locating servers 106 and high-performance storage systems on localized high-performance networks. Centralizing the servers 106 and storage systems and coupling them with advanced system management tools allows more efficient use of server resources.

The servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if the servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alta, California; the Xen hypervisor, an open source product whose development is overseen by Citrix Systems, Inc. of Fort Lauderdale, Florida; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, California.

Management of the machine farm may be de-centralized. For example, one or more servers 106 may comprise components, subsystems, and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, a plurality of servers 106 may be in the path between any two communicating servers 106.

Figure 1B:
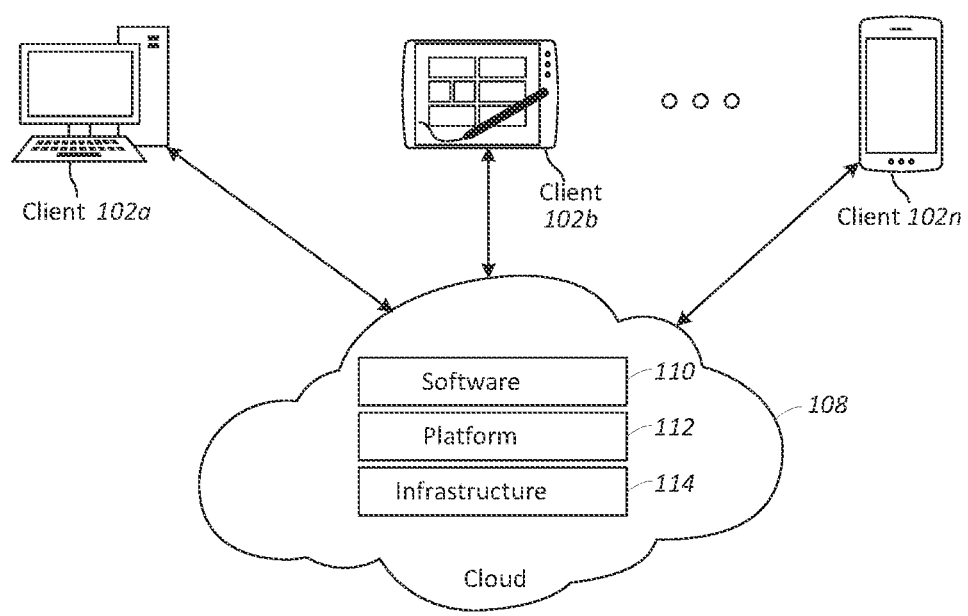
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or zero client may depend on the connection to the cloud 108 or server 106 to provide functionality. A zero client may depend on the cloud 108 or other networks 104 or servers 106 to retrieve operating system data for the client device 102. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud-based delivery, e.g. Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers, or virtualization resources from large pools, allowing the users to quickly scale up by accessing more resources as needed. Examples of IaaS include Amazon Web Services (AWS) provided by Amazon, Inc. of Seattle, Washington, Rackspace Cloud provided by Rackspace Inc. of San Antonio, Texas, Google Compute Engine provided by Google Inc. of Mountain View, California, or RightScale provided by RightScale, Inc. of Santa Barbara, California. PaaS providers may offer functionality provided by IaaS, including, e.g., storage, networking, servers, or virtualization, as well as additional resources, e.g., the operating system, middleware, or runtime resources. Examples of PaaS include Windows Azure provided by Microsoft Corporation of Redmond, Washington, Google App Engine provided by Google Inc., and Heroku provided by Heroku, Inc. of San Francisco California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, California, or Office365 provided by Microsoft Corporation. Examples of SaaS may also include storage providers, e.g., Dropbox provided by Dropbox Inc. of San Francisco, California, Microsoft OneDrive provided by Microsoft Corporation, Google Drive provided by Google Inc., or Apple iCloud provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. Google Chrome, Microsoft Internet Explorer, or Mozilla Firefox provided by Mozilla Foundation of Mountain View, California). Clients 102 may also access SaaS resources through smartphone or tablet applications, including e.g., Salesforce Sales Cloud, or Google Drive App. Clients 102 may also access SaaS resources through the client operating system, including e.g., Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

The client 102 and server 106 may be deployed as and/or executed on any type and form of computing device, e.g., a computer, network device or appliance capable of communicating on any type and form of network and performing the operations described herein.

Figure 1C:
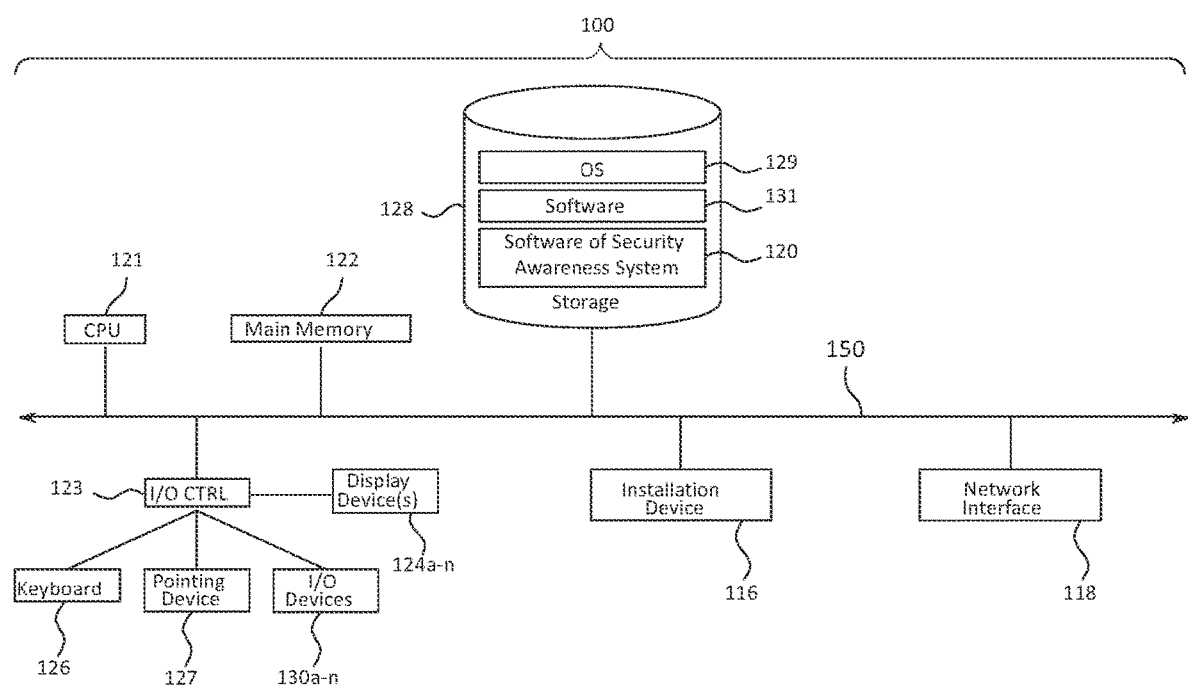
FIG. 1C and FIG. 1D are block diagrams depicting embodiments of computing devices useful in connection with the methods and systems described herein.
Figure 1D:
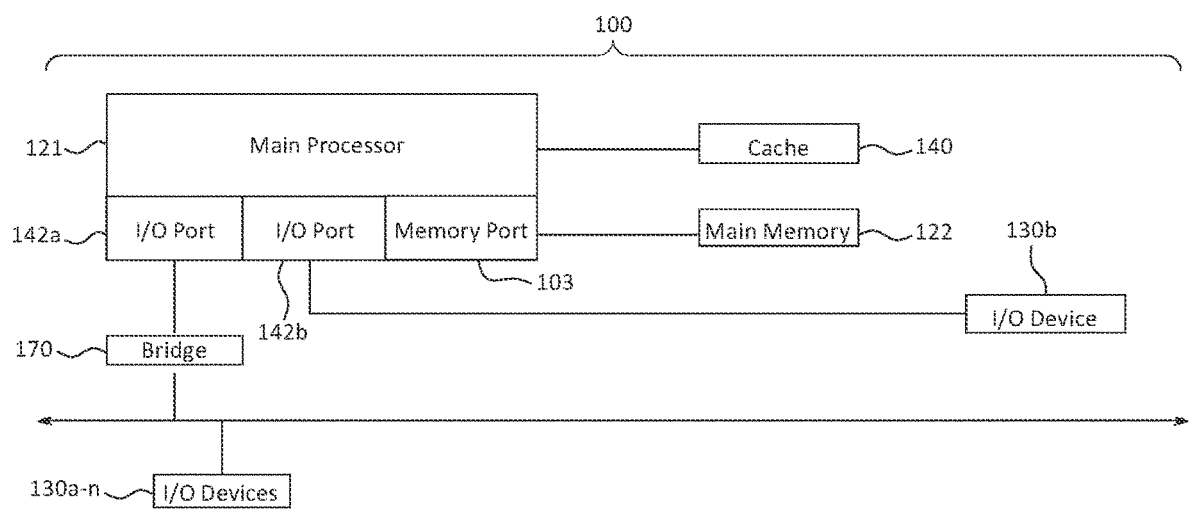

FIG. 1C and FIG. 1D depict block diagrams of a computing device 100 useful for practicing an embodiment of the client 102 or a server 106. As shown in FIG. 1C and FIG. 1D, each computing device 100 includes a central processing unit (CPU) 121, and a main memory unit 122. As shown in FIG. 1C, a computing device 100 may include a storage device 128, an installation device 116, a network interface 118, and I/O controller 123, display devices 124a-124n, a keyboard 126 and a pointing device 127, e.g., a mouse. The storage device 128 may include, without limitation, an Operating System (OS) 129, software 131, and software of a security awareness system 120. As shown in FIG. 1D, each computing device 100 may also include additional optional elements, e.g., a memory port 103, a bridge 170, one or more Input/Output (I/O) devices 130a-130n (generally referred to using reference numeral 130), and a cache memory 140 in communication with the central processing unit 121.

The central processing unit 121 is any logic circuitry that responds to, and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by the central processing unit 121. Main memory unit 122 may be volatile and faster than storage 128 memory. Main memory units 122 may be Dynamic Random-Access Memory (DRAM) or any variants, including Static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile Random Access Memory (NVRAM), flash memory, non-volatile static RAM (nvSRAM), Ferroelectric RAM (FeRAM), Magnetoresistive RAM (MRAM), Phase-change RAM (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above-described memory chips, or any other available memory chips capable of operating as described herein. In the embodiment shown in FIG. 1C, the central processing unit 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the central processing unit 121 communicates directly with cache memory 140 via a secondary bus, sometimes referred to as a backside bus. In other embodiments, the central processing unit 121 communicates with cache memory 140 using the system bus 150. Cache memory 140 typically has a faster response time than main memory 122 and is typically provided by SRAM, BSRAM, or EDRAM. In the embodiment shown in FIG. 1D, the central processing unit 121 communicates with various I/O devices 130 via a local system bus 150. Various buses may be used to connect the central processing unit 121 to any of the I/O devices 130, including a PCI bus, a PCI-X bus, a PCI-Express bus, or a NuBus. For embodiments in which the I/O device is a video display 124, the central processing unit 121 may use an Advanced Graphic Port (AGP) to communicate with the display 124 or the I/O controller 123 for the display 124. FIG. 1D depicts an embodiment of a computer 100 in which the central processing unit 121 communicates directly with I/O device 130b or other central processing units 121' via HYPERTRANSPORT, RAPIDIO, or INFINIBAND communications technology. FIG. 1D also depicts an embodiment in which local busses and direct communication are mixed: the central processing unit 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple iPhone. Some devices 130a-130n allow gesture recognition inputs through combining some of the inputs and outputs. Some devices 130a-130n provide for facial recognition which may be utilized as an input for different purposes including authentication and other commands. Some devices 130a-130n provide for voice recognition and inputs, including, e.g., Microsoft KINECT, SIRI for iPhone by Apple, Google Now or Google Voice Search, and Alexa by Amazon.

Additional devices 130a-130n have both input and output capabilities, including, e.g., haptic feedback devices, touchscreen displays, or multi-touch displays. Touchscreen displays, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices 130a-130n may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation device 116 for the computing device 100. In still other embodiments, the computing device 100 may provide USB connections (not shown) to receive handheld USB storage devices. In further embodiments, a I/O device 130 may be a bridge between the system bus 150 and an external communication bus, e.g., a USB bus, a SCSI bus, a FireWire bus, an Ethernet bus, a Gigabit Ethernet bus, a Fiber Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode (LED) displays, digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect, or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments, software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One of ordinary skill in the art will recognize and appreciate the various ways and embodiments that a computing device 100 may be configured to have multiple display devices 124a-124n.

Referring again to FIG. 1C, the computing device 100 may comprise storage device 128 (e.g., one or more hard disk drives or redundant arrays of independent disks) for storing an operating system or other related software, and for storing application software programs such as any program related to the software of security awareness system 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices 128 may include multiple volatile and non-volatile memories, including, e.g., solid state hybrid drives that combine hard disks with solid state cache. Some storage devices 128 may be non-volatile, mutable, or read-only. Some storage devices 128 may be internal and connect to the computing device 100 via a bus 150. Some storage devices 128 may be external and connect to the computing device 100 via a I/O device 130 that provides an external bus. Some storage devices 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage devices 128 may also be used as an installation device 116 and may be suitable for installing software and programs. Additionally, the operating system and the software can be run from a bootable medium, for example, a bootable CD, e.g., KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX, and direct asynchronous connections). In one embodiment, the computing device 100 communicates with other computing devices 100' via any type and/or form of gateway or tunneling protocol e.g., Secure Socket Layer (SSL) or Transport Layer Security (TLS), or the Citrix Gateway Protocol manufactured by Citrix Systems, Inc. The network interface 118 may comprise a built-in network adapter, network interface card, PCMCIA network card, EXPRESSCARD network card, card bus network adapter, wireless network adapter, USB network adapter, modem, or any other device suitable for interfacing the computing device 100 to any type of network capable of communication and performing the operations described herein.

A computing device 100 of the sort depicted in FIG. 1B and FIG. 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOW 10, all of which are manufactured by Microsoft Corporation of Redmond, Washington; MAC OS and iOS, manufactured by Apple, Inc.; and Linux, a freely-available operating system, e.g., Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, or a NINTENDO DS, NINTENDO 3DS, NINTENDO WII, or a NINTENDO WII U device manufactured by Nintendo Co., Ltd., of Kyoto, Japan, or an XBOX 360 device manufactured by Microsoft Corporation.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the iPod Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple lossless audio file formats and .mov, .m4v, and .mp4 MPEG-4 (H.264/MPEG-4 AVC) video file formats.

In some embodiments, the computing device 100 is a tablet e.g., the iPAD line of devices by Apple; GALAXY TAB family of devices by Samsung; or KINDLE FIRE, byAmazon.com, Inc. of Seattle, Washington. In other embodiments, the computing device 100 is an eBook reader, e.g. the KINDLE family of devices by Amazon.com, or NOOK family of devices by Barnes & Noble, Inc. of New York City, New York.

In some embodiments, the communications device 102 includes a combination of devices, e.g., a smartphone combined with a digital audio player or portable media player. For example, one of these embodiments is a smartphone, e.g., the iPhone family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g., a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in network 104 is monitored as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for User Alias Correction

The following describes systems and methods for user alias correction. In examples, user alias correction may involve one or more of flagging, removing, or correcting one or more user aliases that are incorrect or ambiguous.

Hackers may exploit users of an organization to gain access to assets of the organization. In response, the organization may provide security training to the users to prevent cybersecurity attacks. However, in certain scenarios, generic security training may not be effective due to the lack of context and timeliness of the security training. In examples, effective training is real-time, personalized for each user, relevant to the users' role in the organization, and is based not only on the current risk but also on anticipated future threats. These requirements for effective training and appropriate security actions may depend on the accurate association of security events with the users. A security event may refer to a cybersecurity attack or a cybersecurity threat that involves or is attributable to a user. Examples of security events include, but are not limited to, phishing attacks, connections to insecure devices or websites, downloading from insecure or malicious websites, providing user credentials to insecure or malicious websites, and attempting to download or install software. In scenarios where the association of a security event with a user is robust, the user may be provided security training relevant to the security event. Likewise, relevant security trainings pertaining to the security events may be provided to all users of the organization. This may lead to greater security awareness, informed users, and a safer organization. In examples, a reliable history of security incidents, user and training may be built.

A user of an organization typically uses many information technology (IT) devices or systems in the course of his or her work in the organization. In examples, access to those IT devices or systems typically requires the user to establish or create credentials. Examples of credentials include a username and password. Different IT devices or systems often have different credentials. Additionally, different IT devices or systems may rely on different IT resources. For example, an IT resource used by a user of one IT device or system may be different from an IT resource used by the same user on another IT device or system.

User aliases may be established when a known association between user metadata and a user exists. User aliases may be used to associate security events with users of an organization, such that the users can be coached, trained, or have their risk scores modified based on the security events. In an example, a user alias may be used to determine a user of the organization with which a security event may be associated. A user alias directly maps a security event identifier with a user of an organization. A user may have multiple user aliases. In examples, a user alias may be assigned to a user directly (for example by a system administrator or by the user himself or herself) using a user interface (UI). In an example, the system administrator may approve a user's selected user alias via a UI. In examples, a security awareness system may process security events received by security endpoints and other IT systems and may map the security events to one or more users of the organization using established user aliases.

In examples, if a user "John Smith" joins "XYZ" organization and is added to an organizational directory such as Active Directory and assigned an email address "jsmith@XYZ.com", then a user alias that may be established for the user "John Smith" may be "<jsmith>→John Smith". In some examples, user aliases may also be established when an IT device (hereinafter referred to as a device) is associated with the user "John Smith", for example, using an internet protocol (IP) address assigned to the device on a network. In an example, a user alias established for the user "John Smith" may be "<192.168.14.238>→John Smith". In some examples, a user alias may be established using a media access control (MAC) address of a network interface or an adapter in the device. In an example, a user alias established for the user "John Smith" may be "<68:7F:74: 12:34:56>→John Smith". Each of "jsmith", "192.168.14.238" and "68:7F:74:12:34:56" may be considered as alias identifiers of different user aliases for the user "John Smith".

User aliases should be unambiguous when established or when viewed independently. A security event may include one or more security event identifiers. A security event identifier is an aspect of a security event which identifies it. For example, if a security event is an attempted access to an unauthorized website, then a security event identifier of the security event may be an IP address of a device that is used to attempt the access. Security event identifiers may be classified by type. Examples of security event identifier types include username, IP address, MAC address, and hostname.

In examples, a left-hand-side (LHS) of a user alias may be referred to as an alias identifier. For example, for a user alias "<jsmith>→John Smith", an alias identifier may be "jsmith". Alias identifiers may be classified by type, where the types of alias identifiers are aligned with the types of security event identifiers and the types of rules.

A rule is an expression which maps a security event identifier to a user using user metadata. For example, a security event identifier forms a left-hand-side (LHS) of a rule. The right-hand-side (RHS) of the rule is an expression which is searched against user metadata in user records, of the same type. In an example, the RHS of the rule is executed against metadata of user records until one or more users are matched (which indicates that the rule maps the security event to a user). In an example, the RHS of all rules (rules of each type) are executed against all user metadata of all user records (of the corresponding type) and any user matches which are found are recorded. After the completion of the execution of the rules of the rule type, the recorded user matches are analyzed to see if they are identical (an unambiguous mapping was found) or if no users were matched or if two or more users were matched (which indicates that the rules of the rule type cannot unambiguously map the security event to a user). A rule type may be aligned with a security event identifier type. When a security event is detected, the different types of security event identifiers that are present determine the type of rule that is executed.

In certain scenarios, organizational information may change over time which may result in changes to user metadata. User aliases can be rendered incorrect or ambiguous by the change or addition of user metadata. In examples, new users may be added to the Active Directory who share same attributes with existing users. For example, two users may share the same first name "John". For example, the Active Directory of the organization may have two users, "John Smith" and "John Snow". For system derived aliases with the alias identifier as first name, there is no way to know which "John" a security event with the security event identifier of type first name equal to "John" should be associated with.

In examples, the rule may be of type "username". The rule of type "username" is described in Table 1 provided below.

TABLE 1

Example rule of type "username"

| Rule # | LHS (Security Event Identifier) | Security Event Identifier/Rule Type | RHS (Metadata) |
|---|---|---|---|
| 1 | username(event) | username | <firstName> |

In examples, a security event may have a username (event) "John". There may be an ambiguity as to which user to assign the security event to because the security event can be associated with either the user "John Smith" or the user "John Snow". Also, in some scenarios, different rules of the same type may map a security event to two or more different users. Two different rules of same type are described in Table 2 provided below.

TABLE 2

Examples of two different rules of same type "username"

| Rule # | LHS (Security Event Identifier) | Security Event Identifier/Rule Type | RHS (Metadata) |
|---|---|---|---|
| 1 | username(event) | username | <firstName> |
| 2 | username(event) | username | <email_username> |

In examples, the Active Directory of the organization may have two users, "Smith Jones" and "Jacob Smith". In an example, an email address of the user "Smith Jones" may be "jones@customer.com" and an email address of the user "Jacob Smith" may be "smith@customer.com". In an example, a security event may have a username (event) "Smith". There may be an ambiguity as to which user to assign the security event to, because the security event may be associated with either the user "Smith Jones" or the user "Jacob Smith".

In some examples, ambiguities may also be caused by new or different metadata of the organization. For example, IT devices may be reassigned to new users, users may move physical locations and their IT devices may be reassigned with IP addresses that were previously assigned to other IT devices of other users. A system administrator may also create new rules which may result in the creation of new user aliases as the new rules match security events. The new user aliases may conflict with user aliases that already exist or may render an existing user alias obsolete. As a result, a user alias that was previously unambiguous may suddenly become ambiguous thereby rendering the security awareness system unable to associate a security event with a user, or may lead the security awareness system to incorrectly associate a security event to a user. In scenarios where a security event cannot be associated with a user alias of a user, it may not be possible to unambiguously determine which user should be associated with the security event. In such scenarios, the opportunity to provide relevant training to the user associated with the security event may be lost. Consequently, the organization may be exposed to a security risk. Therefore, systems and methods for correcting user aliases are required.

The present disclosure describes systems and methods for user alias correction. According to aspects of the present disclosure, an alias correction process may be executed against existing user aliases in order to flag, remove, or correct user aliases that are no longer capable of returning unambiguous results.

Figure 2:
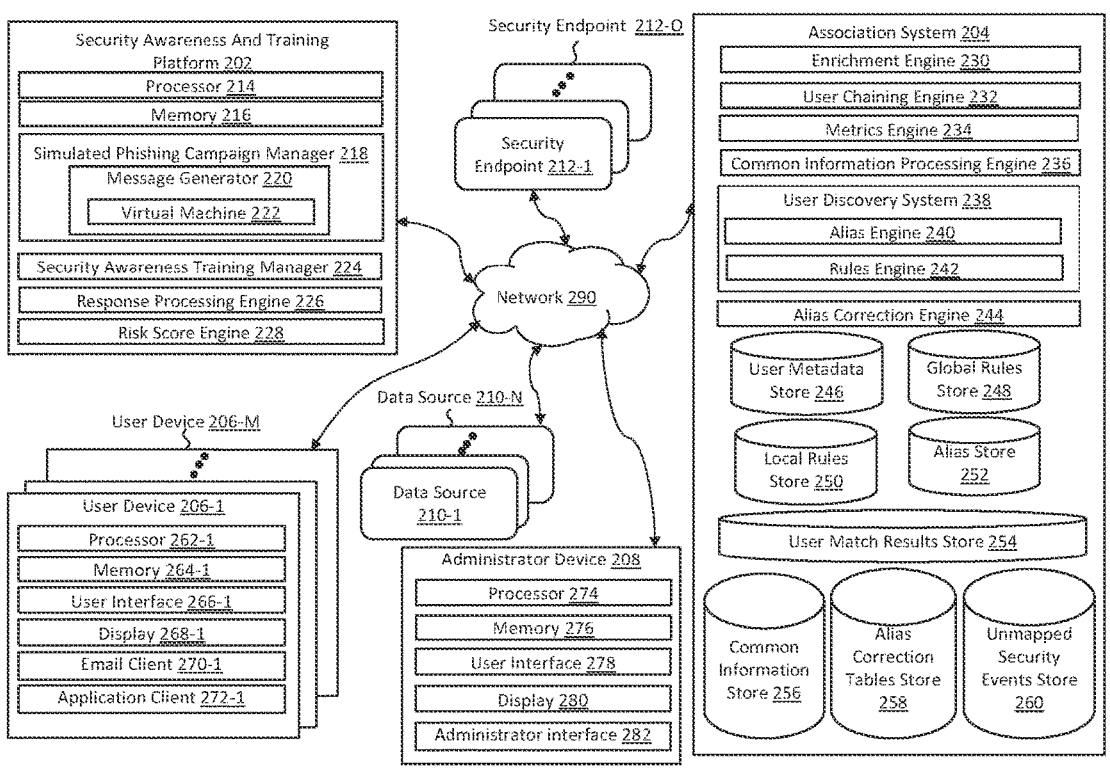
FIG. 2 depicts an implementation of some of a server and client architecture of a system for correcting one or more user aliases, according to some embodiments.

Referring to FIG. 2, in a general overview, FIG. 2 depicts some of the server architecture of an implementation of a system 200 for user alias correction, according to some embodiments. System 200 may include security awareness and training platform 202, association system 204, user device(s) 206(1-M), administrator device 208, data sources 210-(1-N), security endpoints 212-(1-O), and network 290 enabling communication between the system components for information exchange. Network 290 may be an example or instance of network 104, details of which are provided with reference to FIG. 1A and its accompanying description.

According to some embodiments, security awareness and training platform 202 and association system 204 may be implemented in a variety of computing systems, such as a mainframe computer, a server, a network server, a laptop computer, a desktop computer, a notebook, a workstation, and the like. In an implementation, security awareness and training platform 202 and association system 204 may be implemented in a server, such as server 106 shown in FIG. 1A. In some implementations, security awareness and training platform 202 and association system 204 may be implemented by a device, such as computing device 100 shown in FIG. 1C and FIG. 1D. In some embodiments, each of security awareness and training platform 202 and association system 204 may be implemented as a part of a cluster of servers. In some embodiments, each of security awareness and training platform 202 and association system 204 may be implemented across a plurality of servers, thereby, tasks performed by security awareness and training platform 202 and association system 204 may be performed by the plurality of servers. These tasks may be allocated among the cluster of servers by an application, a service, a daemon, a routine, or other executable logic for task allocation. The term "application" as used herein may refer to one or more applications, services, routines, or other executable logic or instructions. Each of security awareness and training platform 202 and association system 204 may comprise a program, service, task, script, library, application, or any type and form of executable instructions or code executable on one or more processors. Security awareness and training platform 202 and association system 204 may be combined into one or more modules, applications, programs, services, tasks, scripts, libraries, applications, or executable code.

In one or more embodiments, security awareness and training platform 202 may be a system that manages items relating to cybersecurity awareness for an organization. The organization may be an entity that is subscribed to or that makes use of services provided by security awareness and training platform 202. In examples, the organization may be expanded to include all users within the organization, vendors to the organization, or partners of the organization. According to an implementation, security awareness and training platform 202 may be deployed by the organization to monitor and educate users thereby reducing cybersecurity threats to the organization. In an implementation, security awareness and training platform 202 may educate users within the organization by performing simulated phishing campaigns on the users. In an example, a user of the organization may include an individual that is tested and trained by security awareness and training platform 202. In examples, a user of the organization may include an individual that can or does receive electronic messages. For example, the user may be an employee of the organization, a partner of the organization, a member of a group, an individual who acts in any capacity of security awareness and training platform 202, such as a system administrator, or anyone associated with the organization. The system administrator may be an individual or team managing organizational cybersecurity aspects on behalf of an organization. The system administrator may oversee and manage security awareness and training platform 202 to ensure cybersecurity awareness training goals of the organization are met. For example, the system administrator may oversee Information Technology (IT) systems of the organization for configuration of system personal information use, managing simulated phishing campaigns, identification, and classification of threats within reported emails, and any other element within security awareness and training platform 202. Examples of system administrator include an IT department, a security team, a manager, or an Incident Response (IR) team. In some implementations, security awareness and training platform 202 may be owned or managed or otherwise associated with an organization or any entity authorized thereof.

A simulated phishing attack is a technique of testing a user to see whether the user is likely to recognize a true malicious phishing attack and act appropriately upon receiving the malicious phishing attack. The simulated phishing attack may include links, attachments, macros, or any other simulated phishing threat (also referred to as an exploit) that resembles a real phishing threat. In response to user interaction with the simulated phishing attack, for example, if the user clicks on a link (i.e., a simulated phishing link), the user may be provided with security awareness training. In an example, security awareness and training platform 202 may be a Computer Based Security Awareness Training (CBSAT) system that performs security services such as performing simulated phishing attacks on a user or a set of users of the organization as a part of security awareness training.

According to some embodiments, security awareness and training platform 202 may include processor 214 and memory 216. For example, processor 214 and memory 216 of security awareness and training platform 202 may be CPU 121 and main memory 122, respectively as shown in FIG. 1C and FIG. 1D. Further, security awareness and training platform 202 may include simulated phishing campaign manager 218. Simulated phishing campaign manager 218 may include various functionalities that may be associated with cybersecurity awareness training. In an implementation, simulated phishing campaign manager 218 may be an application or a program that manages various aspects of a simulated phishing attack, for example, tailoring and/or executing a simulated phishing attack. A simulated phishing attack may test the readiness of a user to manage phishing attacks such that malicious actions are prevented. For instance, simulated phishing campaign manager 218 may monitor and control timing of various aspects of a simulated phishing attack including processing requests for access to attack results and performing other tasks related to the management of a simulated phishing attack.

In some embodiments, simulated phishing campaign manager 218 may include message generator 220 having virtual machine 222. Message generator 220 may be an application, service, daemon, routine, or other executable logic for generating messages. The messages generated by message generator 220 may be of any appropriate format. For example, the messages may be email messages, text messages, short message service (SMS) messages, instant messaging (IM) messages used by messaging applications such as, e.g., WhatsApp™, or any other type of message. In examples, a message type to be used in a particular simulated phishing communication may be determined by, for example, simulated phishing campaign manager 218. Message generator 220 generates messages in any appropriate manner, e.g., by running an instance of an application that generates the desired message type, such as running, e.g., a Gmail® application, Microsoft Outlook™, WhatsApp™, a text messaging application, or any other appropriate application. Message generator 220 may generate messages by running a messaging application on virtual machine 222 or in any other appropriate environment. Message generator 220 generates the messages to be in a format consistent with specific messaging platforms, for example, Outlook 365™, Outlook® Web Access (OWA), Webmail™, iOS®, Gmail®, and such formats.

In an implementation, message generator 220 may be configured to generate simulated phishing communications using a simulated phishing template. A simulated phishing template is a framework used to create simulated phishing communications. In some examples, a simulated phishing template may specify the layout and content of one or more simulated phishing communications. In an example, the a simulated phishing template may include fixed content including text and images. In some examples, a simulated phishing template may be designed according to theme or subject matter. The simulated phishing template may be configurable by a system administrator. For example, the system administrator may be able to add dynamic content to the simulated phishing template, such as a field that will populate with a recipient's name and email address when message generator 220 prepares simulated phishing communications based on the simulated phishing template for sending to a user. In an example, the system administrator may be able to select one or more exploits to include in the simulated phishing template, for example, one or more simulated malicious URLs, one or more simulated macros, and/or one or more simulated attachments. An exploit is an interactable phishing tool in simulated phishing communications that can be clicked on or otherwise interacted with by a user. A simulated phishing template customized by the system administrator can be used for multiple different users in the organization over a period of time or for different campaigns. In some examples, a system administrator may select a simulated phishing template from a pool of available simulated phishing templates and may send such a "stock" template to users unchanged. The simulated phishing template may be designed to resemble a known real phishing attack such that simulated phishing communications based on the simulated phishing template may be used to train users to recognize these real attacks.

In some embodiments, security awareness and training platform 202 may include security awareness training manager 224, response processing engine 226, and risk score engine 228. In an implementation, security awareness training manager 224 may be an application or a program that includes various functionalities that may be associated with providing security awareness training to users of the organization. In an example, training material may be provided or presented to the users as a part of training. In examples, security awareness training manager 224 provides or presents the training material when the user interacts with a simulated phishing communication. In some examples, security awareness training manager 224 provides or presents training material during usual training sessions. The training material may include material to educate users of the risk of interacting with suspicious messages (communications) and train users on precautions in dealing with unknown, untrusted, and suspicious messages.

According to an implementation, security awareness training manager 224 may provide training to the users via landing pages. In an example, a landing page may be a web page element which enables provisioning of training materials. In some examples, the landing page may be a pop-up message. A pop-up message shall be understood to refer to the appearance of graphical or textual content on a display. In examples, the training material or the learning material may be presented on the display as part of, or bounded within, a "window" or a user interface element or a dialogue box. Other known examples and implementations of training materials are contemplated herein.

In an implementation, response processing engine 226 may be an application or a program that is configured to receive and process user interaction with the simulated phishing attack. The user interaction may include a user clicking a simulated phishing link, downloading attachments such as a file or a macro, opening the message, replying to the message, clicking on the message, deleting the message without reporting, reporting the message, or not taking any action on the message. If the user has clicked a simulated phishing link, downloaded attachments such as a file or a macro, deleted the message without reporting, opened the message to read the contents, replied to the message, clicked on the message, deleted the message or did not take any action on the message, response processing engine 226 may provide the user with corresponding security awareness training based on aforementioned type of the user interaction with the simulated phishing message. For user interaction that involves the user reporting the message, response processing engine 226 may share a congratulatory message and update a user maturity level of the user in the organization.

In an implementation, risk score engine 228 may be an application or a program for determining and maintaining risk scores for users in an organization. A risk score of a user may be a representation of vulnerability of the user to a malicious attack or the likelihood that a user may engage in an action associated with a security risk. In an implementation, risk score engine 228 may maintain more than one risk score for each user. Each such risk score may represent one or more aspects of vulnerability of the user to a specific cyberattack. In an implementation, risk score engine 228 may calculate risk scores for a group of users, for the organization, for an industry (for example, an industry to which the organization belongs), a geography, and so on. In an example, a risk score of the user may be modified based on the user's responses to simulated phishing communications, completion of training by the user, a current position of the user in the organization, a size of a network of the user, an amount of time the user has held the current position in the organization, a new position of the user in the organization if the position changes, for example due to a promotion or change in department and/or any other attribute that can be associated with the user.

In an implementation, response processing engine 226 and risk score engine 228 amongst other units, may include routines, programs, objects, components, data structures, etc., which may perform particular tasks or implement particular abstract data types. In examples, response processing engine 226 and risk score engine 228 may also be implemented as signal processor(s), state machine(s), logic circuitries, and/or any other device or component that manipulate signals based on operational instructions.

In some embodiments, response processing engine 226 and risk score engine 228 may be implemented in hardware, instructions executed by a processing module, or by a combination thereof. In examples, the processing module may be central processing unit 121, as shown in FIG. 1D. The processing module may comprise a computer, a processor, a state machine, a logic array, or any other suitable devices capable of processing instructions. The processing module may be a general-purpose processor which executes instructions to cause the general-purpose processor to perform the required tasks or the processing module may be dedicated to performing the required functions. In some embodiments, response processing engine 226 and risk score engine 228 may be machine-readable instructions which, when executed by a processor/processing module, perform intended functionalities of response processing engine 226 and risk score engine 228. The machine-readable instructions may be stored on an electronic memory device, hard disk, optical disk, or other machine-readable storage medium or non-transitory medium. In an implementation, the machine-readable instructions may also be downloaded to the storage medium via a network connection.

Referring again to FIG. 2, in some embodiments, association system 204 may include enrichment engine 230, user chaining engine 232, metrics engine 234, common information processing engine 236, and user discovery system 238. In some embodiments, user discovery system 238 may include alias engine 240 and rules engine 242. In an implementation, association system 204 also includes alias correction engine 244.

In an implementation, enrichment engine 230, user chaining engine 232, metrics engine 234, common information processing engine 236, user discovery system 238, alias engine 240, rules engine 242, and alias correction engine 244 amongst other units, may include routines, programs, objects, components, data structures, etc., which may perform particular tasks or implement particular abstract data types. In examples, enrichment engine 230, user chaining engine 232, metrics engine 234, common information processing engine 236, user discovery system 238, alias engine 240, rules engine 242, and alias correction engine 244 may also be implemented as signal processor(s), state machine(s), logic circuitries, and/or any other device or component that manipulate signals based on operational instructions.

In some embodiments, enrichment engine 230, user chaining engine 232, metrics engine 234, common information processing engine 236, user discovery system 238, alias engine 240, rules engine 242, and alias correction engine 244 may be implemented in hardware, instructions executed by a processing module, or by a combination thereof. In examples, the processing module may be central processing unit 121, as shown in FIG. 1D. The processing module may comprise a computer, a processor, a state machine, a logic array, or any other suitable devices capable of processing instructions. The processing module may be a general-purpose processor which executes instructions to cause the general-purpose processor to perform the required tasks or the processing module may be dedicated to performing the required functions. In some embodiments, enrichment engine 230, user chaining engine 232, metrics engine 234, common information processing engine 236, user discovery system 238, alias engine 240, rules engine 242, and alias correction engine 244 may be machine-readable instructions which, when executed by a processor/processing module, perform intended functionalities of enrichment engine 230, user chaining engine 232, metrics engine 234, common information processing engine 236, user discovery system 238, alias engine 240, rules engine 242, and alias correction engine 244. The machine-readable instructions may be stored on an electronic memory device, hard disk, optical disk, or other machine-readable storage medium or non-transitory medium. In an implementation, the machine-readable instructions may also be downloaded to the storage medium via a network connection. Although, association system 204 is shown external to security awareness and training platform 202, in some embodiments, association system 204 may be implemented within security awareness and training platform 202.

Further, in some embodiments, association system 204 may include user metadata store 246, global rules store 248, local rules store 250, alias store 252, user match results store 254, common information store 256, alias correction tables store 258, and unmapped security events store 260.

In an implementation, user metadata store 246 may store information and metadata associated with users of an organization. In examples, metadata (interchangeably referred to as user metadata) may be available from several different sources or provided by different mechanisms. For example, Active Directory integration or the uploading of user information in an Excel format by the organization may provide metadata for users. In some examples, metadata may also be associated with IT devices which are associated with the users. Examples of user metadata include usernames, hostnames, IP addresses, handles and device IDs. User attributes, user relationships, and other information may be used by a process to align metadata to a user. Examples of user attributes include addresses, roles, department, or organizational units. Examples of user relationships include manager, subordinate, human resource partner, dotted reporting manager, peer, corporate buddy, etc.

In one or more embodiments, user metadata store 246 may comprise a user attribute lake. The user attribute lake may include user data records (where there is one user data record for each user) which include all known data about the users. For example, user attributes may be used to assign a device MAC address to a user, or to assign an IP address to a user. The assignment of metadata to a user may be associated with a confidence score which represents how confident the metadata association to the user is, based on user attributes and other user information about the user in the organization. In an example, the confidence score may be a value from 1 to 10, where 10 represents the highest level of confidence and 1 represents the lowest level of confidence. For example, an identifying metadata of a device may be a hostname, a MAC address, a domain name, an IP address, an international mobile equipment identity (IMEI), an international mobile subscriber identity (IMSI), a phone number, a device ID, or any other identifying attributes. If the device is assigned to only one user of the organization, then the metadata of the device may be unambiguously associated with the user. For example, a laptop with the hostname "proxy_server_A", MAC address "12:34:56:a2:b4:c6", and IP address "100.123.1.1" may be determined to be associated with the user "userA" because the user "user A" is assigned the laptop with MAC address "12:34:56:a2:b4:c6".

In examples, metadata from different sources, if unambiguously associated with a user, can be combined together into a user record which is stored in user metadata store 246. For example, the user record for the user "userA", in addition to the metadata related to the laptop that is assigned to the user "userA", may include the email address "userA@email.com" which is extracted from the Active Directory of the organization.

In an implementation, global rules store 248 may store global rules. In examples, the global rules may be created by association system 204. In an implementation, local rules store 250 may store local rules. In examples, the local rules may be created by a system administrator. In examples, the aggregation of the local rules and the global rules may be referred to as a combined rules list. All global rules and all local rules are subsequently referred to as rules. Each rule has a left-hand-side (LHS), a rule type, and a right-hand-side (RHS). The LHS is a security event identifier and the RHS is user metadata. The rules are explained in greater detail later in the disclosure.

In an implementation, alias store 252 may store user aliases. In examples, the user aliases may be created by association system 204. User aliases may be used to associate security events with users of an organization. In an implementation, user match results store 254 may store one or more match results. A match result is an incident of the LHS of a rule matching the RHS of the rule. A match result may be considered together with other match results of a same security event to determine whether or not a user alias should be created or removed.

In an implementation, common information store 256 may store security events after conversion to a common format. In an implementation, alias correction tables store 258 may store one or more alias correction tables. In an implementation, unmapped security events store 260 may store unmapped security events (i.e., the security events that are mapped to more than one user or that have not been mapped to any user). In examples, user metadata stored in user metadata store 246, global rules stored in global rules store 248, local rules stored in local rules store 250, user aliases stored in alias store 252, one or more match results stored in user match results store 254, security events after conversion to common format stored in common information store 256, one or more alias correction tables stored in alias correction tables store 258, and unmapped security events stored in unmapped security events store 260 may be periodically or dynamically updated as required.

Referring again to FIG. 2, in some embodiments, user device 206-(1-M) may be any IT device used by a user (all devices of user device 206-(1-M) are subsequently referred to as user device 206-1 but the description may be generalized to any of user device 206-(1-M)). The user may be an employee of an organization, a client, a vendor, a customer, a contractor, a system administrator, or any person associated with the organization. User device 206-1 may be any computing device, such as a desktop computer, a laptop, a tablet computer, a mobile device, a Personal Digital Assistant (PDA), or any other computing device. In an implementation, user device 206-1 may be a device, such as client device 102 shown in FIG. 1A and FIG. 1B. User device 206-1 may be implemented by a device, such as computing device 100 shown in FIG. 1C and FIG. 1D. According to some embodiments, user device 206-1 may include processor 262-1 and memory 264-1. In an example, processor 262-1 and memory 264-1 of user device 206-1 may be CPU 121 and main memory 122, respectively, as shown in FIG. 1C and FIG. 1D. User device 206-1 may also include user interface 266-1, such as a keyboard, a mouse, a touch screen, a haptic sensor, a voice-based input unit, or any other appropriate user interface. It shall be appreciated that such components of user device 206-1 may correspond to similar components of computing device 100 in FIG. 1C and FIG. 1D, such as keyboard 126, pointing device 127, I/O devices 130*a-n* and display devices 124*a-n*. User device 206-1 may also include display 268-1, such as a screen, a monitor connected to the device in any manner, or any other appropriate display, which may correspond to similar components of computing device 100, for example display devices 124*a-n*. In an implementation, user device 206-1 may display received content (for example, a simulated phishing communication based on a simulated phishing template) for the user using display 268-1 and is able to accept user interaction via user interface 266-1 responsive to the displayed content.

Referring again to FIG. 2, in some embodiments, user device 206-1 may include email client 270-1 and application client 272-1. In one example, email client 270-1 may be a cloud-based application that can be accessed over network 290 without being installed on user device 206-1. In an implementation, email client 270-1 may be any application capable of composing, sending, receiving, and reading email messages. In an example, email client 270-1 may facilitate a user to create, receive, organize, and otherwise manage email messages. In an implementation, email client 270-1 may be an application that runs on user device 206-1. In some implementations, email client 270-1 may be an application that runs on a remote server or on a cloud implementation and is accessed by a web browser. For example, email client 270-1 may be an instance of an application that allows viewing of a desired message type, such as any web browser, Microsoft Outlook™ application (Microsoft, Mountain View, California), IBM® Lotus Notes® application, Apple® Mail application, Gmail® application (Google, Mountain View, California), WhatsApp™ (Facebook, Menlo Park, California), a text messaging application, or any other known or custom email application. In an example, a user of user device 206-1 may be mandated to download and install email client 270-1 on user device 206-1 by the organization. In an example, email client 270-1 may be provided by the organization as default. In some examples, a user of user device 206-1 may select, purchase and/or download email client 270-1 through an application distribution platform. In some examples, user device 206-1 may receive simulated phishing communications via email client 270-1. User device 206-1 may also include application client 272-1. In an implementation, application client 272-1 may be a client side program or a client side application that is run on user device 206-1. In examples, application client 272-1 may be a desktop application, mobile application, etc. Other user devices 206-(2-M) may be similar to user device 206-1.

Referring back to FIG. 2, in some embodiments, administrator device 208 may be any device used by a system administrator to perform administrative duties. Administrator device 208 may be any computing device, such as a desktop computer, a laptop, a tablet computer, a mobile device, a Personal Digital Assistant (PDA), smart glasses, or any other computing device. In an implementation, administrator device 208 may be a device, such as client device 102 shown in FIG. 1A and FIG. 1B. Administrator device 208 may be implemented by a device, such as computing device 100 shown in FIG. 1C and FIG. 1D. According to some embodiments, administrator device 208 may include processor 274 and memory 276. In an example, processor 274 and memory 276 of administrator device 208 may be CPU 121 and main memory 122, respectively, as shown in FIG. 1C and FIG. 1D. Administrator device 208 may also include user interface 278, such as a keyboard, a mouse, a touch screen, a haptic sensor, a voice-based input unit, or any other appropriate user interface. It shall be appreciated that such components of administrator device 208 may correspond to similar components of computing device 100 in FIG. 1C and FIG. 1D, such as keyboard 126, pointing device 127, I/O devices 130*a-n* and display devices 124*a-n*. Administrator device 208 may also include display 280, such as a screen, a monitor connected to the device in any manner, a wearable glass, or any other appropriate display. In some implementations, administrator device 208 may include an administrator interface 282. Administrator interface 282 may be supported by a library, an application programming interface (API), a set of scripts, or any other code that may enable the system administrator to manage security awareness and training platform 202 and association system 204.

In an implementation, data sources 210-(1-N) may be sources within (and sometimes outside) the organization that maintain data related to users in the organization (referred to as "user data"). The data includes one or more user data records of one or more users. Each of the one or more user data records include one or more user attributes of one or more users of the organization. In examples, data sources 210-(1-N) may be related to any aspect of the organization, such as a security data source, a business operations data source, an asset management data source, or a user and identity data source. In an example, data sources 210-(1-N) may be cloud-based security software. Examples of a security data source are endpoint security systems such as CrowdStrike Falcon, SentinelOne Singularity, Kaspersky Endpoint Security, or Broadcom Symantec Endpoint Protection. Examples of a business operations data source are human capital management (HCM) applications such as Oracle HCM, SAP HCM, or Workday, IT incident applications such as ServiceNow, or sales and finance applications such as Salesforce or SAP. Examples of an asset management data source are ServiceNow, or Microsoft Dynamics. Examples of user and identity data source are Microsoft Active Directory. In some examples, data sources 210-(1-N) may be synchronized and may share information between them and in other examples, data sources 210-(1-N) may be isolated and standalone.

In an implementation, data sources 210-(1-N) may include user data in the form of a collection of user attributes and in the form of a record. A user attribute is a piece of information that is associated with the user. The form of record represents the user in the data source. In examples, each data source 210-(1-N) may be realized as a database, as a spreadsheet, as a file, or by any other electronic means which may be parsed by an algorithm running on a computer system. Examples of a user attribute include a name, an email address, an email aliases, a reporting structure (manager and subordinates), a network username, an IT application username, a role within a network (e.g., system administrator, user, superuser), networks permissions, user devices (e.g., hostnames, cell phone IMEI), installed software, and endpoint security software. Each data source 210-(1-N) may store information in a format that is specific to the application or the database which is managing data source 210-(1-N). Each record in data source 210-(1-N) may be referred to as a user data record.

According to an embodiment, security endpoints 212-(1-O) may be systems that are implemented by an organization to monitor nodes or endpoints of the network that are closest to an end user device, for example for compliance with security standards. An 'endpoint' is any device that is physically an end point on a computer network. Examples of endpoints are laptops, desktop computers, mobile phones, tablet devices, servers, and virtual environments. Examples of endpoint security services provided by an endpoint security system include antivirus software, email filtering, web filtering, and firewall services. In an example, security endpoints 212-(1-O) may also provide protection from cybersecurity threats posed by lack of compliance with security standards on the endpoints. In an implementation, each of security endpoints 212-(1-O) may include a secure email gateway or other system deployed by an organization. In an example, security endpoints 212-(1-O) may be third-party systems. In an implementation, security endpoints 212-(1-O) may operate to protect the organization by detecting, intercepting, or recording risky actions of users of the organization. In an implementation, security endpoints 212-(1-O) may be configured to block or record user actions that may expose the organization to risk or that may violate the policies or rules of the organization. Examples of activities that security endpoints 212-(1-O) may block or record include network traffic going to Uniform Resource Locators (URLs) that are not allowed (i.e., that are blacklisted), peer to peer traffic connecting to certain ports, user access to an insecure File Transfer Protocol (FTP) server, a direct terminal connection (for example, with telnet) with unencrypted traffic, use of unencrypted protocols (for example, http://) when encrypted protocols (for example, https://) are available, violation of company security policies (for example, the use of thumb drives or use of certain file extensions), execution of unsigned code, execution of code downloaded from the Internet, and traffic from non-secure networks (for example, not using a Virtual Private Network (VPN) to connect to devices). Known examples of endpoint security system 204 include CrowdStrike™ Falcon (Austin, Texas), Palo Alto Networks (Santa Clara, California), NetSkope NewEdge (Santa Clara, California), Zscaler (San Jose, California), SentinelOne Singularity Platform (Mountainview, California), Kaspersky Endpoint Security (Moscow, Russia), or Broadcom Symantec Endpoint Protection (San Jose, California).

Figure 3:
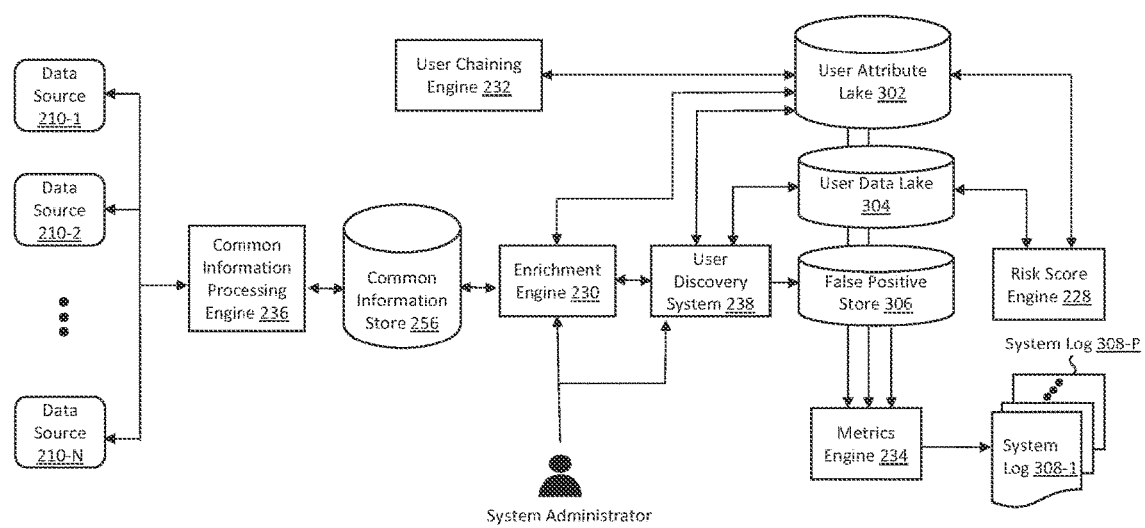
FIG. 3 illustrates a flow diagram of a user discovery and identification process, according to some embodiments.

FIG. 3 illustrates flow diagram 300 of a user discovery and identification process, according to some embodiments.

According to an implementation, common information processing engine 236 may convert user data in one or more user data records from data sources 210-(1-N) into a common format to ensure that the format of the user data records is consistent. Common information store 256 may store the user data records after conversion into the common format.

In an implementation, enrichment engine 230 may periodically or on-demand perform collation, cross-referencing, and/or correlation of user data records stored in common information store 256. Each of the one or more user data records may include one or more user attributes of one or more users of an organization. Using the one or more user data records, enrichment engine 230 may, in some examples, automatically perform cross-referencing and/or correlation. Cross-referencing may include reviewing the one or more user data records having one or more user attributes to identify attributes that may appear to have some similarity.

According to an implementation, user chaining engine 232 may be communicatively coupled to user attribute lake 302. In an example, user attribute lake 302 may include master user data records from enrichment engine 230. In examples, there may be exactly one master user data record for each user and the master user data record may include known data about the specific user.

In the implementation, user chaining engine 232 may analyze one or more user data records to identify where there are more than one user data record which refers to one user in the organization. In an example, user chaining engine 232 may analyze the same user attributes between different user data records to determine those user data records which are identical and/or those user data records which are similar. In some examples, user chaining engine 232 may use a threshold, above which the user attributes being compared may be considered to refer to the same user in the organization.

When there is a security event, user discovery system 238 may attempt to identify a user associated with the security event. In one example, user discovery system 238 may receive the security event from user data lake 304. In an implementation, user data lake 304 may be a data store that includes information on security events. In an example, user data lake 304 may be populated with data from one or more security endpoints, from one or more security awareness systems, from one or more other security-related systems, or a combination. An individual data record in user data lake 304 may correspond to an individual security event.

In some examples, user discovery system 238 may receive the security event directly from response processing engine 226, although data associated with the security event may be recorded in user data lake 304. In some examples, the security event includes metadata that describes the user associated with the security event. In some examples, the metadata describes the user in terms of the security system (e.g., security endpoint) which generated the security event. For example, response processing engine 226 may share a phishing incident with metadata indicating an involvement of "Mat_Joe_Champ" in an organization's intranet social media network. In an implementation, user discovery system 238 may identify that "Mat_Joe_Champ" is associated with "Mathew_joe@example.com". Based on the identification, user discovery system 238 may map "Mat_Joe_Champ" to "Mathew_joe@example.com". In an implementation, risk score engine 228 may calculate a risk score for the user that is mapped by user discovery system 238. In an example, if the user already has a risk score, then risk score engine 228 may modify the risk score of the user based on the security incident and the previous score. In some implementations, user discovery system 238 may determine that an association between the user associated with the security event and the user of the organization may be a false positive association. In an implementation, user discovery system 238 may store this result in false positive store 306. In examples, a mapping is not made between the user associated with the security event and the user of the organization. According to an implementation, metrics engine 234 may receive data from one or more of user attribute lake 302, user data lake 304, and false positive store 306 and provide metrics on the function of association system 204. In examples, metrics engine 234 may generate a plurality of system logs 308-(1-P) representing activities of association system 204. In examples, system logs 308-(1-P) may be in the form of syslogs, text files, rich-text reports, portable document format (PDF) documents, word processor documents, or any other format that may include the log of activity.

According to aspects of the present disclosure, a security event should be unambiguously mapped to a single user so that the security event can be useful for security risk assessment and security awareness training assignment. According to an implementation, upon detecting a security event, association system 204 may initiate an association process and attempt to associate (or map) the security event with a user of the organization. In examples, association system 204 may be configured to associate a user with a security event based on metadata in user records stored in user metadata store 246. A security event may include one or more security event identifiers of different types. The one or more security event identifiers may represent the information associated with the security event. In an implementation, association system 204 may execute a combined rules list against the one or more security event identifiers. As described earlier, the combined rules list may be an aggregation of the global rules stored in global rules store 248 and the local rules stored in local rules store 250. In examples, each rule may have a rule type which may be aligned to a security event identifier type. Example of a combined rule list illustrating rules of different rule types is shown in Table 3 provided below.

TABLE 3

Example of a combined rule list illustrating rules of different rule types

| Rule # | LHS (Security Event Identifier) | Security Event Identifier/Rule Type | RHS (Metadata) |
|---|---|---|---|
| 1 | username(event) | username | <firstName> + <lastName> |
| 2 | email_username(event) | email username | <email_username> |
| 3 | IP_address(event) | IP address | <device_IPaddress> |
| 4 | WLAN_MAC(event) | WLAN MAC address | <device_WLAN_MACaddress> |
| 5 | BT_MAC(event) | BT MAC address | <device_BT_MACaddress> |

In examples, rules in the combined rule list may be grouped based on the type of information that the LHS of the rule considers (which is the rule type which aligns with the security event identifier type). The example combined rule list shown in Table 3 includes five different rule types with an example of one rule each. In examples, the format of the RHS of the rules may depend on the implementation. For example, a JavaScript Object Notation (JSON) expression for "<firstName>+<lastName>" may be "firstName&lastName"

In an implementation, for each security event identifier of a given type, association system 204 may execute a rule of the same type to determine if the rule matches the security event identifier with any metadata in user records stored in user metadata store 246. In examples, association system 204 may execute a combined rules list. When the execution of the combined rules list generates (or creates) one or more match results for the security event to a single user, the security event may be mapped to that user. A match result may be an incident of the LHS of a rule matching the RHS of the rule. A match result may be considered together with other match results of the same security event to determine whether or not a user alias should be created or removed. In examples, it may not be necessary for all of the security event identifiers to be matched to metadata by the rules in the combined rules list. For example, a security event may have three security event identifiers including an email username, an IP address, and a hostname. There may be a rule of type "email username" that matches the security event identifier of type "email username" to metadata associated with a user, while there are no rules of type "IP address" or "hostname". Accordingly, the security event identifier of type "IP address" and the security event identifier of type "hostname" are not used in the security event mapping by rules, however the security event may still be mapped to a user. In an implementation, when an unambiguous association between a user of an organization and a security event can be made, association system 204 may create a user alias for the user. In examples, association system 204 may establish a user alias "email username".

Considering the above example, association system 204 may create or establish a user alias between the security event identifier "email username" of the security event and the user. In an example, if a security event can be mapped to a user because at least one security event identifier results in a match result with user metadata, then a user alias may be created for each security event identifier of the security event. In the above example, in addition to establishing a user alias "email username", association system 204 may establish two (2) additional user aliases for the same user. in examples, the two additional user aliases may include "IP address" and "hostname". The user aliases that are created or established may associate the security event identifiers of the matched rules with the user to which the security event was mapped. Accordingly, it may not be necessary to map all security event identifiers of a security event to a single user. Only a single security event identifier type may have to be unambiguously mapped. In examples, user aliases that are established or created by association system are stored in alias store 252. In an implementation, when the execution of the combined rules list results in the mapping of a security event to more than one user, then no user aliases may be created, and the security event may be moved to unmapped security events store 260.

According to an implementation, association system 204 may check security event identifiers of subsequent security events. In examples, if security event identifiers of a security event match alias identifiers and a user is unambiguously identified, then the user may be mapped to the security event. In examples, if association system 204 maps a security event to a user, then association system 204 may terminate an association process for that security event. In an implementation, upon detecting a security event, alias engine 240 may initiate an association process for the security event. According to the association process, alias engine 240 may attempt to map a security event to a user. If the security event is mapped to a user, then alias engine 240 terminates the association process for the security event.

In an implementation, if a security event is not mapped to any user of the organization, then alias engine 240 may pass the security event to rules engine 242. According to an implementation, rules engine 242 may attempt to unambiguously map the security event to a user of the organization based on one or more rules and security event identifiers of the security event. In examples, each rule may have a rule type which may be aligned to a security event identifier type. In an example, a rule may be classified either as an exact rule or as a contains rule.

For an exact rule, a security event identifier may have to match the metadata in user records exactly. In examples, a security event identifier of a security event forms a LHS of a rule. The rule and the security event identifier may have to be of the same type. The RHS of the rule may be searched against the metadata of user records, again of the same type. In an example, the RHS of the rule may be executed against metadata of user records until two different users are matched (which indicates that the rule cannot unambiguously map the security event to a user). In an example, the RHS of all rules (rules of each type) may be executed against all metadata of all user records (of the corresponding type). Any user matches which are found may be recorded. In examples, after the completion of the execution of the rules, rules engine 242 may analyze the recorded user matches to determine if they are identical (which indicates that an unambiguous mapping is found) or if two or more users are matched (which indicates that the rules of the rule type cannot unambiguously map the security event to a single user). Examples of exact rules are described in Table 4 provided below.

TABLE 4

Examples of Exact Rules

| Rule # | LHS (Security Event Identifier) | Security Event Identifier/Rule Type | RHS (Metadata) |
|---|---|---|---|
| 1 | username(event) | username | <firstName> + <lastName> |
| 2 | hostname(event) | hostname | <hostname> |
| 3 | email_username(event) | email username | <email_username> |

In an implementation, once a security event is mapped to a user of an organization (i.e., an unambiguous match is found between one or more security event identifiers and metadata of the user), rules engine 242 may create a user alias for the user thereby associating the security event identifiers with the user. In examples, if a security event identifier of type "email username" exactly matches an email username assigned to a user of the organization (as contained in a user record in user metadata store 246), and no other matches between other security event identifiers (of any type) match other users, then the security event may be mapped to the user of the organization using this exact rule. For example, a security event identifier of type "email username" is "jsmith". This is used as the LHS of the rule of type "email username". In the example, no other security event identifiers are present.

In examples, there may be one or more user records for a user "John Smith" in user metadata store 246. The one or more user records may include an email address "jsmith@XYZ.com", an email username "jsmith", and hostname "XYZ.com". In an implementation, rules engine 242 may execute Rule #3 (described in Table 4) which is a rule of the same type as the security event identifier (i.e., "email username") against the metadata of type "email username" in the user record for the user "John Smith". According to an implementation, execution of Rule #3 against the metadata of type "email username" in the user record for the user "John Smith" may result in the following:

Rule #3: *jsmith* = *jsmith* → security event is matched to John Smith

According to an implementation, rules engine 242 may execute the security event identifier "jsmith" against metadata of the type "email username" in user records for other users to determine if the security event is matched to any other user of the organization. If no other match is found or determined, rules engine 242 may associate the security event identifier "jsmith" with the user "John Smith" and create a user alias for the user.

In examples, a security event may be detected on a device with one or more identifying metadata, and a security event identifier type may be an identifier of a device. In an example, the security event identifier type may be "IP address" or "MAC address". In examples, the security event identifier of type "IP address" may be assigned to the LHS of one or more rules with type "IP address". In an implementation, rules engine 242 may execute the security event identifier of type "IP address" against metadata in user records of type "IP address" until one match is found (i.e., the security event identifier of type "IP address" is mapped to a single user). If more than one match is found, then the security event cannot be unambiguously mapped to a user and the security event may be stored in unmapped security events store 260.

In examples, if a match to a single user is found and the security event has security event identifiers of other types and there are one or more rules of the same type, then rules engine 242 may create a match result and store the match result in user match results store 254 while other rules are executed. In an implementation, rules engine 242 may execute the security event identifiers of other types for which there are one or more rules of the same type against metadata in the user records stored in user metadata store 246. In examples, where the execution of a rule for a type of security event identifier results in a match to a single user, rules engine 242 may further create a match result.

In some examples, if the execution of a rule for a type of security event identifier matches more than one user, then the security event may be moved or stored into unmapped security events store 260 and no further rules are run or executed. For example, if a security event identifier of type "name" matches two users when a rule of type "name" is executed, then the security event is moved to unmapped security events store 260. In an example, if the execution of a rule of one rule type and security event identifier type match more than one user, and there are rules and security event identifiers of other types, then those other types of rules and security event identifiers may be executed. In examples, if one type of security event identifier can be matched to a single user, then the security event may be mapped to the user.

In examples, a security event may have a security event identifier type of an intranet social media network handle (interchangeably referred to as handle) and no further security event identifiers. A combine rule list which includes a rule of type "handle" is described in Table 5 provided below.

TABLE 5

Example rule of type "handle"

| Rule # | LHS (Security Event Identifier) | Security Event Identifier/Rule Type | RHS (Metadata) |
|---|---|---|---|
| 1 | handle(event) | Handle | <handle> |

In examples, a security event identifier of type "handle" may be "Mat_Joe_Champ". The rule of the same type as the security event identifier may be Rule #1 described in Table 5. In an implementation, rules engine 242 may execute the Rule #1 to attempt to match the security event identifier to metadata in one or more user records in user metadata store 246. In an example, there may be one or more user records for a user "Matthew Joe" in user metadata store 246. The one or more user records may include an email address "mjoe@ABC.com", an email username "mjoe", and a handle "Mat_Joe_Champ". In an implementation, execution of the Rule #1 described in Table 5 may result in a match to a single user "Matthew Joe". In an implementation, rules engine 242 may create a match result between the security event identifier of type "handle" and the user. In examples, as rules engine 242 uniquely identifies the user associated with the security event, rules engine 242 may create a user alias for the user. In addition, information pertaining to the identification of the mapping between the security event and the user "Matthew Joe" may be provided to security awareness and training platform 202. In response, security awareness and training platform 202 may adjust the risk score of the user "Matthew Joe", for example based on a current risk score and an assessment of the severity of the security event. In examples, security awareness training (related to the security event) may be triggered for the user "Matthew Joe". In some examples, other security actions may be triggered by security awareness and training platform 202 or other systems.

As described earlier, a rule may be classified either as an exact rule or as a contains rule. According to contains rule, a matching user metadata entry may have to contain a security event identifier, but may additionally have other, non-conflicting metadata. In examples, a contains rule may have a greater probability of creating ambiguity in the association of a security event with a single user. Examples of contains rules are described in Table 6 provided below.

TABLE 6

Examples of contains rules

| Rule # | LHS (Security Event Identifier) | Security Event Identifier/Rule Type | RHS (Metadata) |
|---|---|---|---|
| 1 | username-contains(event) | username contains | <firstName> + <lastName> |
| 2 | hostname-contains(event) | hostname contains | <hostname> |
| 3 | email_username-contains(event) | email username contains | <email_username> |

As with exact rules, if non conflicting match results are found between contains rules of all types, then an unambiguous mapping is found and the user associated with the user metadata of the one or more matches is associated with the security event identifiers of the one or more matches and one or more user aliases may be created and stored in alias store 252. In examples, a contains rule may be structured in different ways. According to an example structure (referred to as "example structure A"), a contains rule may be structured such that the RHS of the contains rule may be the security event identifier and the LHS of the contains rule may be the user metadata. In this example, the structure of the contains rule may be "<metadata> IS CONTAINED IN<security event identifier>". According to another example structure (referred to as "example structure B"), a contains rule may be structured such that the LHS of the contains rule may be security event identifier and the RHS of the contains rule may be user metadata. In this example, the structure of the contains rule may be "<Security Event Identifier> CONTAINS <metadata>".

In an implementation, a contains rule may result in an ambiguous mapping. For example, a security event identifier of type "username" may be "jon". As shown in Table 6, Rule #1 is of type "username contains". In an example, there may be one or more user records for a user "Jon Smith" in user metadata store 246. The one or more user records for the user "Jon Smith" may include a username "Jon Smith", an email address "jsmith@XYZ.com", and a hostname "XYZ.com". In some examples, one or more user records for a user "Jonathan Wright" may also be stored in user metadata store 246. The one or more user records for the user "Jonathan Wright" may include a username "Jonathan Wright", an email address "jwright@XYZ.com", and a hostname "XYZ.com". In an implementation, execution of the Rule #1 of Table 6 may result in the following:

---
{Example Structure A}
---
User A - Jon Smith
Rule #1: JonSmith IS CONTAINED IN jon → Match result is created between security event identifier and Jon Smith
User B - Jonathan Wright
Rule #1: JonathanWright IS CONTAINED IN jon → Match result is created between security event identifier and Jonathan Wright ---
{Example Structure B}
---
User A - Jon Smith
Rule #1: jon CONTAINS JonSmith → Match result is created between security event identifier and Jon Smith
User B - Jonathan Wright
Rule #1: jon CONTAINS JonathanWright → Match result is created between security event identifier and Jonathan Wright

---

In an implementation, as illustrated in the above example, the contains rule results in ambiguity as the security event identifier of type "user name" may be mapped to the user "Jon Smith" and the user "Jonathan Wright". Therefore, this type of contains rule cannot unambiguously map the security event to a single user. For the same security event, there may be an additional security event identifier of a different type. For example, a security event identifier may be of type "email username", where the security event identifier may be "js". As shown in Table 6, Rule #3 is of type "email username". In an implementation, execution of the Rule #3 of Table 6 may result in the following:

---
{Example Structure A}
---
  User A - Jon Smith
  Rule #3: jsmith IS CONTAINED IN js → Match result is created between security event identifier and Jon Smith
  User B - Jonathan Wright
  Rule #1: jwright IS NOT CONTAINED IN js → no match ---
{Example Structure B}
---
  User A - Jon Smith
  Rule #1: js CONTAINS jsmith → Match result is created between security event identifier and Jon Smith
  User B - Jonathan Wright
  Rule #1: js CONTAINS jwright → no match

---

In examples, this type of security event identifier may result in an unambiguous match when the contains rule of this type is executed. In an example, because there is an ambiguous match of another security event identifier of the same security event, the security event may not map to a single user. In an example, because there is at least one type of contains rule that results in an unambiguous match result, the security event is mapped to the user of that match result. In some examples, rules of different types are evaluated until one type of rule results in an unambiguous match result, at which point the security event is mapped to the user and no further rules are executed.

Examples by which association system 204 may attempt to map security events to one or more users of the organization based on established aliases or existing aliases stored in alias store 252 are described in detail below.

According to an implementation, one or more security events may be provided as an input to association system 204. In examples, the one or more security events may be generated by different generating systems such as security awareness systems (including security awareness and training platform 202), endpoint security systems (including one or more security endpoints 212-(1-O)), and/or other IT systems deployed by the organization. These generating systems and may interface with association system 204 via one or more application programming interfaces (API). In examples, each security event may be associated with one or more security event identifiers of one or more security event identifier types.

In examples, security events generated by different generating systems may include data (including security event identifiers) in formats that depend upon the generating systems. Prior to or during the input of the security events to association system 204, an API may process the security events to ensure that the format of the security events and its security event identifiers are consistent across all generating systems. In examples, common information processing engine 236 may process all security events prior to their input to association system 204 using a common schema compute cluster in combination with a common information model (CIM). In an implementation, common information processing engine 236 may convert the security events into a common format which is independent of the generating systems. In some implementations, common information store 256 may store the security events after conversion to the common format.

In a streaming process, one or more security event identifiers of a security event may be input to alias engine 240. In an implementation, using the one or more security event identifiers of the security event, alias engine 240 may determine whether there are any user aliases in alias store 252 that can map the one or more security event identifiers to a user. In examples, a LHS of a user alias may be referred to as an alias identifier. For example, for a user alias "<jsmith>→John Smith", an alias identifier may be "jsmith". In examples, alias identifiers may be classified by type, where the types of alias identifiers are aligned with the types of security event identifiers and the types of rules.

In an implementation, alias engine 240 may determine whether a security event identifier match an alias identifier of the same type. In response to determining that the security event identifier matches an alias identifier of the same type, alias engine 240 may create a match result. In some implementations, alias engine 240 may check all security event identifiers of the security event against the alias identifiers of the same type in alias store 252 and create all possible match results. In an implementation, alias engine 240 may analyze the match results to determine if they reference a single user. If the match results reference a single user, then the security event is mapped to the user and information related to the mapped security event is passed to security awareness and training platform 202 for further action.

In an example, alias engine 240 may process security event identifiers by type until a match result to a single user for a type of security event identifier is found (i.e., there is a single match result to a user or if there are more than one match result, they are to the same user). In this example, the security event may be mapped to the user and no further security event identifiers are processed by alias engine 240. If a security event identifier of a type is processed and the result is two or more match results to different users, then it may not be possible to map the security event to a user with the security event identifier of that type. A next type of security event identifier may then be processed to see if one or more match results are created, and if the match results reference a single user. This process may continue until a security event identifier of a particular type results in an unambiguous match result. At that point, alias engine 240 may terminate the association process and associate the security event to the user.

FIG. 4 illustrates flow diagram 400 of a successful security event mapping by alias engine 240, according to some embodiments.

In the example shown in FIG. 4, at step 402 of flow diagram 400, a security event which may be an attempted malicious download onto a device may be received at association system 204. In examples, four security event identifiers may be associated with the security event. The four security event identifiers may include an IP address of the device onto which malicious download was performed (security event identifier of type "IP address"), a WLAN MAC address of the WLAN adapter used (security event identifier of type "WLAN MAC Address"), an email username (security event identifier of type "email username"), and a hostname (security event identifier of type "hostname"). In the example shown in FIG. 4, the security event identifier of type "IP address" is "192.169.3.29", the security event identifier of type "WLAN MAC Address" is "FC:08:4A:65:C6:12", the security event identifier of type "email username" is "abaker", and the security event identifier of type "hostname" is "ABC.com". In an implementation, upon receiving the security event, association system 204 may invoke alias engine 240.

At step 404 of flow diagram 400, alias engine 240 may check (or process) the security event identifier of each type against information stored in alias store 252 (i.e., against user aliases with the same alias identifier type as the security event identifier type).

At step 406 of flow diagram 400, alias engine 240 may determine that the security event identifier of type "IP address", the security event identifier of type "WLAN MAC address", and the security event identifier of type "email username" match to the user "Alice Baker". In an implementation, alias engine 240 may also determine that the security event identifier of type "hostname" does not match any alias identifier of type "hostname" in alias store 252. This is shown as mapping results in FIG. 4.

As one or more security event identifiers map to the user "Alice Baker", at step 408 of flow diagram 400, alias engine 240 may determine that the user "Alice Baker" attempted the malicious download onto the device. Alias engine 240 may map the security event to the user "Alice Baker".

At step 410 of flow diagram 400, alias engine 240 may provide the mapping results to security awareness and training platform 202 (and optionally to other security systems of the organization). In an implementation, security awareness and training platform 202 (or other security system of the organization) may take one or more security actions based on the mapping results. In examples, security awareness and training platform 202 may provide a popup notification on the display of the device and temporarily blocks external network access by the device until the user "Alice Baker" completes one or more mandatory training modules, for example, on malicious download threats.

In examples, user aliases may be unambiguous when established or when viewed independently, however organizational information may change over time which results in changes to metadata in user records. In examples, new users may be added to Active Directory of the organization, devices or adaptors of devices may be reassigned to new users, users may move physical locations and their devices may be reassigned with IP addresses that were previously assigned to other users etc. A system administrator may also create new rules which may result in the creation of new user aliases as the new rules match security event identifiers to user metadata. The new user aliases may conflict with user aliases that already exist or may render an existing user alias obsolete. As a result, a user alias that was previously unambiguous may suddenly become ambiguous thereby rendering alias engine 240 unable to associate a security event with a user, or leading to incorrect association of security events with users. In an example, the laptop of a user "John Smith" may be reassigned to another user and the user "John Smith" may be assigned a new laptop. The new laptop may have an IP address "192.185.22.231" and the WLAN network adaptor of the new laptop may have the MAC address "4C:79:6E:FC:0D:4B". This information may be stored in user metadata store 246 in one or more user records for the user "John Smith", replacing the metadata associated with the original laptop.

Figure 5:
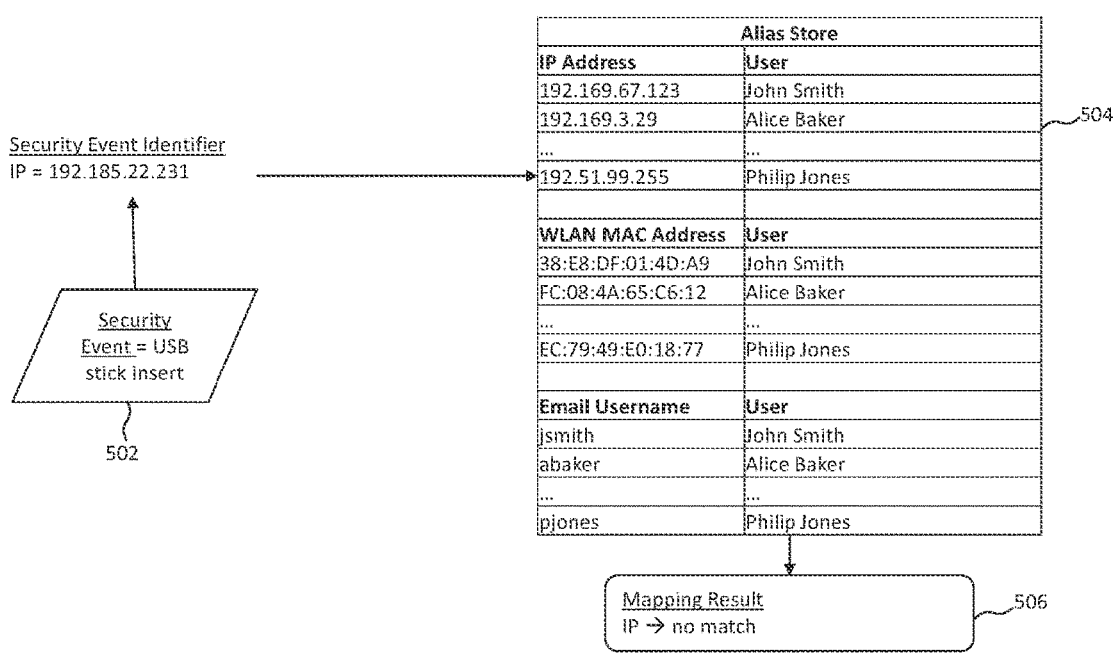
FIG. 5 illustrates a flow diagram of an unsuccessful security event mapping by an alias engine, according to some embodiments.

FIG. 5 illustrates flow diagram 500 of an unsuccessful security event mapping by alias engine 240, according to some embodiments.

In the example shown in FIG. 5, at step 502 of flow diagram 500, a security event which may be a user inserting a Universal Serial Bus (USB) stick into a laptop may be received at association system 204. In examples, a security event identifier may be associated with the security event. The security event identifier may be an IP address of the laptop (security event identifier of type "IP address"). In the example shown in FIG. 5, the security event identifier of type "IP address" is "192.185.22.231". In an implementation, upon receiving the security event, association system 204 may invoke alias engine 240.

At step 504 of flow diagram 500, alias engine 240 may check the security event identifier of type "IP address" against information stored in alias store 252 (i.e., against user aliases with the same alias identifier type as the security event identifier type).

At step 506 of flow diagram 500, alias engine 240 may determine that there is no alias identifier of a user alias in alias store 252 that matches the security event identifier. As a result, alias engine 240 returns no mapping result. In the example shown in FIG. 5, the security event identifier "192.185.22.231" does not match to any alias identifier in alias store 252. In an implementation, association system 204 next invokes rules engine 242. In an implementation, rules engine 242 may create a new user alias which may associate the security event identifier with a user.

Figure 6:
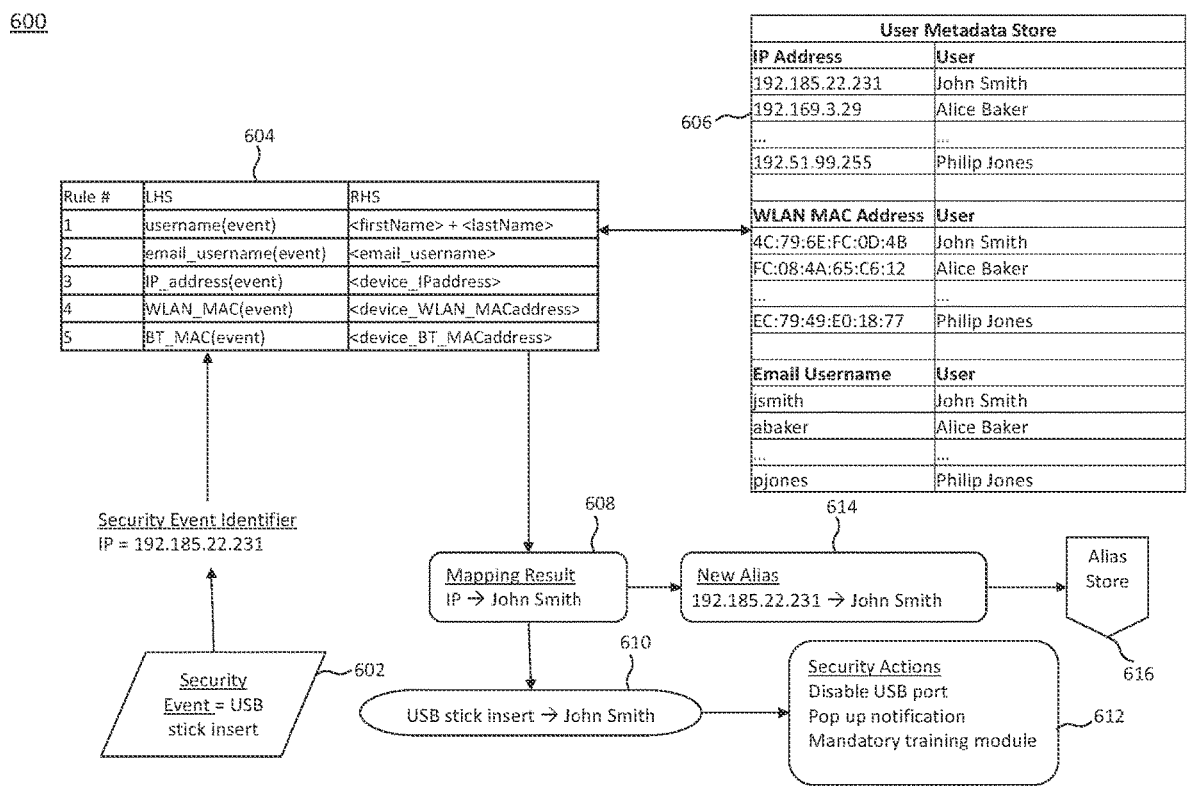
FIG. 6 illustrates a flow diagram of a creation of a new user alias by a rules engine, according to some embodiments.

FIG. 6 illustrates flow diagram 600 of a creation of a new user alias by rules engine 242, according to some embodiments. FIG. 6 is a continuation of FIG. 5 if for example alias engine 240 resulted in "no match".

In the example shown in FIG. 6, at step 602 of flow diagram 600, a security event which may be a user inserting a Universal Serial Bus (USB) stick into a laptop may be received. In the example shown in FIG. 6, the security event identifier associated with the security event is "192.185.22.231".

At step 604 of flow diagram 600, rules engine 242 may identify rules of the same type as the security event identifier.

At step 606 of flow diagram 600, rules engine 242 may execute rules of the same type as the security event identifier on data in user records stored in user metadata store 246, thereby creating a list of match results. In an implementation, rules engine 242 may execute a combined rule list on the data in the user records.

At step 608 of flow diagram 600, rules engine 242 may determine that Rule #3 of type "IP address" of the combined rule list results in a match, and the match result is the security event identifier of type "IP address" associated with the user "John Smith". This is shown as mapping result in FIG. 6. If there are no contradictory match results from Rule #3, then the security event is mapped to the user "John Smith".

At step 610 of flow diagram 600, rules engine 242 may determine that the user "John Smith" inserted the USB stick into the laptop.

At step 612 of flow diagram 600, rules engine 242 may provide the mapping result to security awareness and training platform 202 (and optionally to other security systems of the organization). In an implementation, security awareness and training platform 202 (or other security system of the organization) may take one or more security actions based on the mapping results. In examples, security awareness and training platform 202 may disable the USB port into which the USB stick was inserted. In an example, security awareness and training platform 202 may disable the USB port of the device of the user "John Smith" that has an IP address "192.185.22.231". In some examples, security awareness and training platform 202 may provide a popup notification on the display of the device of the user "John Smith" and require the user "John Smith" to complete one or more mandatory training modules on threats associated with USB sticks.

In the example shown in FIG. 6, since there are no other types of security event identifiers present, the only user alias that may be created may be the one that associates the security event identifier of type "IP Address" to the user "John Smith". At step 614 of flow diagram 600, rules engine 242 may create a new user alias using the mapping result which associates the security event identifier (i.e., the device's IP address "192.185.22.231") with the user "John Smith". At step 616 of flow diagram 600, rules engine 242 may store the new user alias in alias store 252.

FIG. 7 illustrates example 700 of addition of a new user alias by rules engine 242 to alias store 252, according to some embodiments. As shown in FIG. 7, alias store 252 is updated with new user alias for the user "John Smith". In the example shown in FIG. 7, the new user alias for the user "John Smith" is IP address "192.185.22.231" of the device of the user "John Smith" (represented by reference numeral "702").

Figure 8:
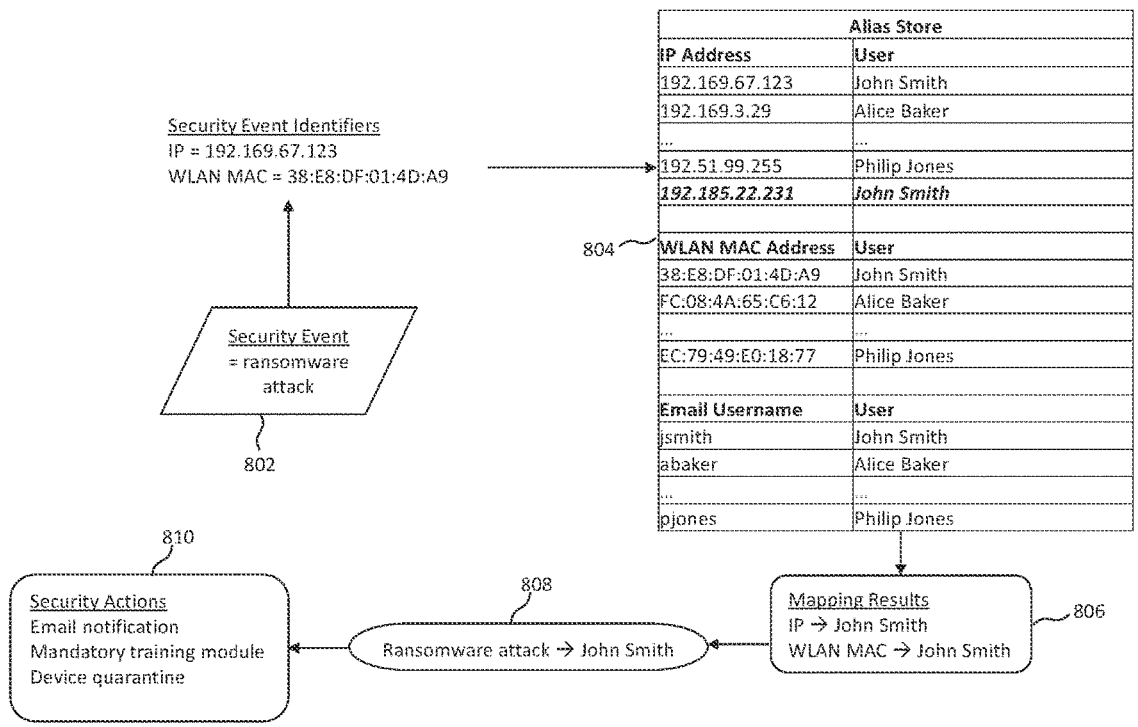
FIG. 8 illustrates a flow diagram of an incorrect security event mapping by an alias engine, according to some embodiments.

FIG. 8 illustrates flow diagram 800 of an incorrect security event mapping by alias engine 240, according to some embodiments.

In the example shown in FIG. 8, at step 802 of flow diagram 800, a security event which may be a ransomware attack may be received at association system 204. In examples, two security event identifiers may be associated with the security event. The two security event identifiers may include an IP address of the affected device (security event identifier of type "IP address") and a WLAN MAC address of the WLAN adapter by which the randomware threat was delivered (security event identifier of type "WLAN MAC Address"). In the example shown in FIG. 8, the security event identifier of type "IP address" is "192.169.67.123", and the security event identifier of type "WLAN MAC Address" is "38:E8:DF:01:4D:A9". In an implementation, upon receiving the security event, association system 204 may invoke alias engine 240.

At step 804 of flow diagram 800, alias engine 240 may check the security event identifiers against alias identifiers of matching types stored in alias store 252. At step 806 of flow diagram 800, alias engine 240 may determine that the security event identifier of type "IP address" and the security event identifier of type "WLAN MAC address" match the user "John Smith". This is shown as mapping results in FIG. 8.

At step 808 of flow diagram 800, alias engine 240 may determine that the user "John Smith" is the target of the ransomware attack because there are user aliases in alias store 252 which match the security event identifier of type "IP address" and the security event identifier of type "WLAN MAC address" to the user "John Smith".

At step 810 of flow diagram 800, alias engine 240 may provide the mapping results to security awareness and training platform 202 (and optionally to other security systems of the organization). In an implementation, security awareness and training platform 202 (or other security system of the organization) may take one or more security actions based on the mapping results. In examples, security awareness and training platform 202 may send an email notification to the user "John Smith" and require that the user "John Smith" completes a mandatory training module. In addition, the device associated with the IP address "192:169:67:123" and WLAN MAC address "38:E8:DF:01:4D:A9" may be quarantined from the network.

According to an implementation, although the user "John Smith" has received the notification and is required to complete mandatory training module, there may be a scenario where the ransomware attack did not involve the user "John Smith" as the device (for example, a laptop) involved in the ransomware attack was reassigned to another user, which is not reflected in alias store 252. As a consequence, the security event may be associated to a wrongly with the user "John Smith". Also, security actions may not be directed to the actual user of the ransomware attack as the actual user is not associated with the security event by alias engine 240 due to the update in metadata in user metadata store 246 not being reflected in alias store 252.

In a further example, the original WLAN network adaptor (MAC address "38:E8:DF:01:4D:A9") on the user "John Smith" original device (IP address "192.169.67.123") may be replaced with a new WLAN network adaptor (MAC address "FC:08:4A:36:B9:04"). The original WLAN network adaptor may then be installed on a device of a user "Philip Jones" having IP address "192.51.99.255".

FIG. 9 illustrates example 900 of updated user metadata store 246, according to some embodiments. As shown in FIG. 9, user records for the user "John Smith" and for the user "Philip Jones" stored in user metadata store 246 are updated with the new information. In examples, WLAN MAC address of the user "John Smith" is updated as "FC:08:4A:36:B9:04" (represented by reference numeral "902") and WLAN MAC address of the user "Philip Jones" is updated as "38:E8:DF:01:4D:A9" (represented by reference numeral "904").

Figure 10:
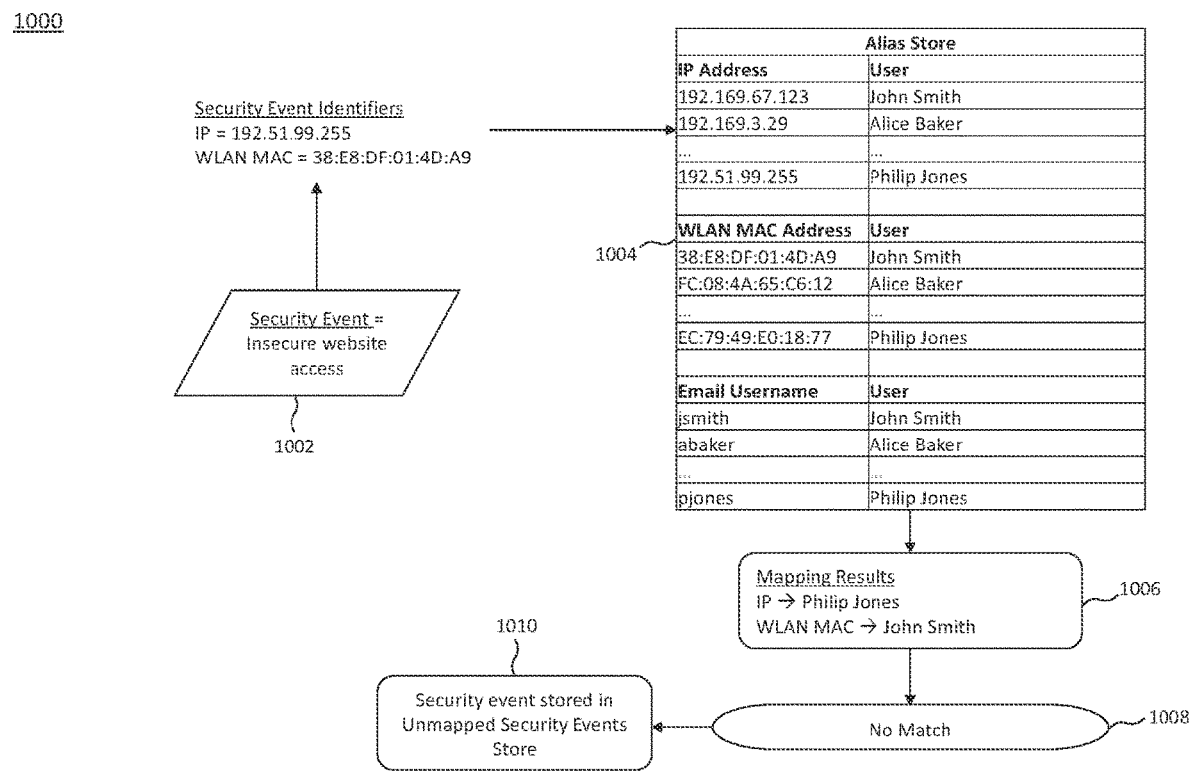
FIG. 10 illustrates a flow diagram of a mapping ambiguity in an alias engine leading to an unmapped security event, according to some embodiments.

FIG. 10 illustrates flow diagram 1000 of a mapping ambiguity in alias engine 240 leading to an unmapped security event, according to some embodiments. In the example shown in FIG. 10, at step 1002 of flow diagram 1000, a security event which may be a user attempting to access an insecure website (i.e., using http:// instead of https://) may be received at association system 204. In examples, two security event identifiers may be associated with the security event. The two security event identifiers may include an IP address of the device used in the access attempt (security event identifier of type "IP address") and a WLAN MAC address of the WLAN adapter of the device used in the access attempt (security event identifier of type "WLAN MAC Address"). In the example shown in FIG. 10, the security event identifier of type "IP address" is "192.51.99.255", and the security event identifier of type "WLAN MAC Address" is "38:E8:DF:01:4D:A9". In this example, the user "Philip Jones" attempted this network access using his device (IP address "192.51.99.255") with the WLAN network adaptor (WLAN MAC address "38:E8:DF:01:4D:A9") that is now in the device of the user "Philip Jones" but was originally installed in the device of the user "John Smith". In an implementation, upon receiving the security event, association system 204 may invoke alias engine 240.

At step 1004 of flow diagram 1000, alias engine 240 may check the security event identifiers against the alias identifiers of same types stored in alias store 252.

At step 1006 of flow diagram 1000, alias engine 240 may determine that the security event identifier of type "IP address" may match with the user "Philip Jones" and the security event identifier of type "WLAN MAC address" match with the user "John Smith". This is shown as mapping results in FIG. 10.

At step 1008 of flow diagram 1000, alias engine 240 may determine that the mapping results are ambiguous and there is no match, i.e., the security event cannot be mapped to a single user. As a result, no security actions are taken.

At step 1010 of flow diagram 1000, alias engine 240 may store the security event in unmapped security events store 260.

According to aspects of the present disclosure, based on the examples described above and other examples, one or more user aliases stored in alias store 252 may be incorrect and render ambiguous results. According to aspects of the present disclosure, alias correction engine 244 may execute an alias correction process on alias store 252 to correct, flag, or remove one or more user aliases stored in alias store 252. In examples, the purpose of the alias correction process may be to correct, flag, or remove user aliases that produce conflicting mappings leading to the inability to map a security event to a user. In examples, corrections made by the alias correction process may prevent an incoming security event from being incorrectly matched to a user by alias engine 240.

According to an implementation, in the normal operation of association system 204, the security event identifiers are provided to rule engine 242 in the case where there are no match results provided by alias engine 240. The security event identifiers become the LHS of the rule evaluation as previously described. In the alias correction process, alias identifiers are defined based on the user aliases in alias store 252.

In an implementation, alias correction engine 244 may identify one or more alias identifiers by type based at least on one or more user aliases stored in alias store 252. In examples, the one or more user aliases may map the one or more alias identifiers to one or more users. The type of alias identifiers includes one or more of IP address, MAC address, and email username.

Figure 11:
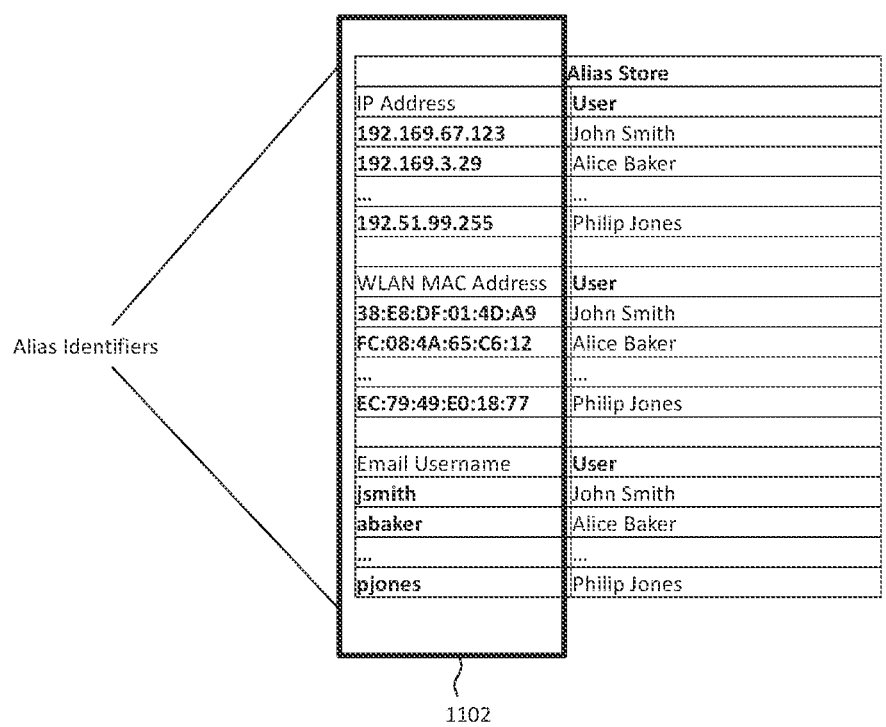
FIG. 11 illustrates an example of alias identifiers stored in an alias store, according to some embodiments.

FIG. 11 illustrates example 1100 of alias identifiers stored in alias store 252, according to some embodiments.

In the example shown in FIG. 11, alias store 252 may include several alias identifiers of an IP address type, several alias identifiers of a WLAN MAC address type, and several alias identifiers of an email username type, in addition to alias identifiers of other types (represented by reference numeral "1102").

In an implementation, alias correction engine 244 may assign each of the one or more alias identifiers to one or more rules of a same type as the one or more alias identifiers. In examples, a rule includes a security event identifier that corresponds to a type of rule. The type of rule may include one or more of IP address, MAC address, or email username. In examples, the rule may have a LHS that includes the security event identifier and a RHS that includes user metadata.

According to an implementation, alias correction engine 244 may assign each alias identifier of a given type to the LHS of one or more rules in the combined rule list of a same type. In an implementation, alias correction engine 244 may execute the one or more rules against one or more user records in user metadata store 246. In examples, alias correction engine 244 may execute rules of type "IP address" against one or more user records in user metadata store 246 that have user metadata which includes an IP address. Examples of the one or more rules that may be executed for alias identifiers of type "IP address" are described in Table 7 provided below.

TABLE 7

Examples of alias identifiers for rules of type "IP Address"

| Rule # | LHS (Security Event Identifier) | RHS (Metadata) |
| --- | --- | --- |
| 3 | 192.169.67.123 | <device_IPaddress> |
| 3 | 192.169.3.29 | <device_IPaddress> |
| 3 | 192.51.99.255 | <device_IPaddress> |

In an implementation, alias correction engine 244 may establish a results table as a result of execution of the one or more rules. In examples, the results table may identify one or more aliases by type found in user metadata store 246.

Figure 12:
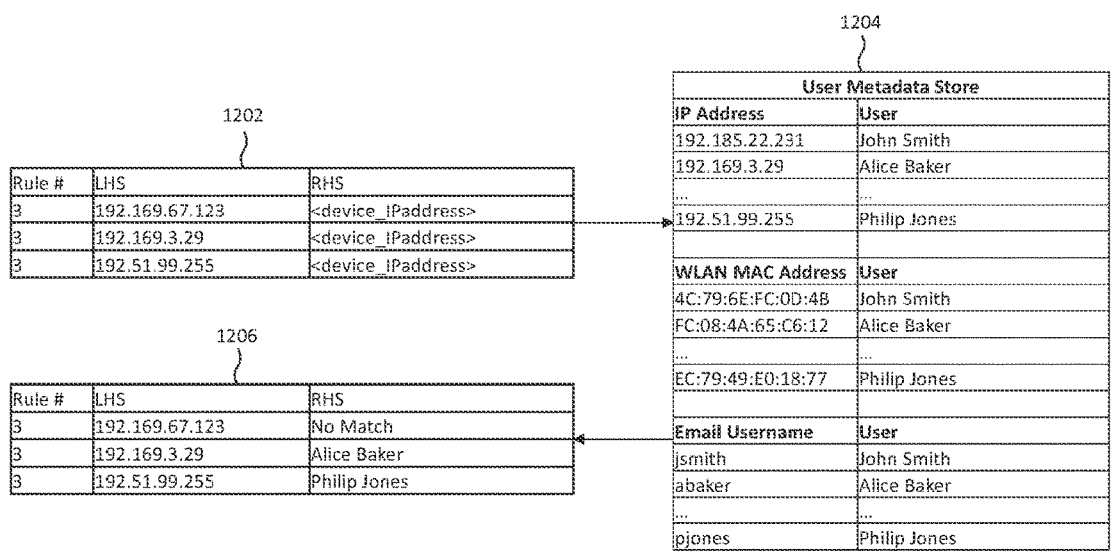
FIG. 12 illustrates an example of a results table of an alias correction process on a rule of type "IP address", according to some embodiments.

FIG. 12 illustrates example 1200 of a results table of an alias correction process on a rule of type "IP address", according to some embodiments. In the example shown in FIG. 12, alias correction engine 244 may execute rules of type "IP address" (represented by reference numeral "1202") against all user records stored in user metadata store 246 (represented by reference numeral "1204"). A results table is established as a result of execution of the rules (represented by reference numeral "1206"). In examples, a series of results may be returned in which the results are either a name of a user or "no match". As shown in the results table, IP address "192.169.67.123" is not mapped to any user, IP address "192.169.3.29" is mapped to the user "Alice Baker", and IP address "192.51.99.255" is mapped to the user "Philip Jones".

According to an implementation, alias correction engine 244 may establish an alias correction table responsive to applying the results table against alias store 252. In examples, the alias correction table may identify one or more aliases of the results table that do not match one or more user aliases.

Figure 13:
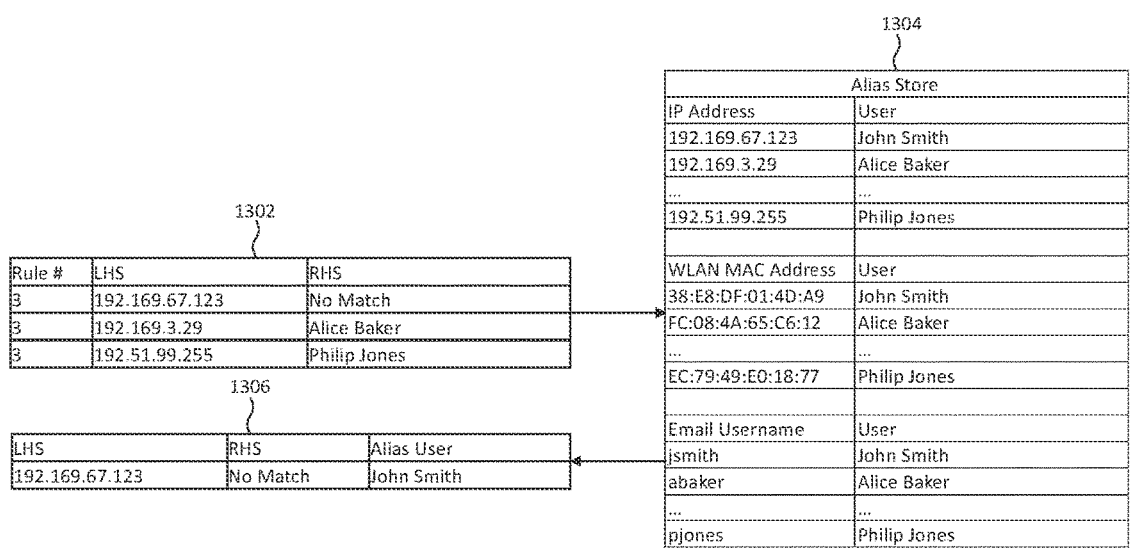
FIG. 13 illustrates an example of creation of an alias correction table for user aliases of type "IP address", according to some embodiments.

FIG. 13 illustrates example 1300 of creation of an alias correction table for user aliases of type "IP address", according to some embodiments. As shown in FIG. 13, an alias correction process may be executed where a results table (represented by reference numeral "1302") is applied against alias store 252 (represented by reference numeral "1304"). In examples, the alias correction process may return an alias correction table (represented by reference numeral "1306") which lists user aliases where the RHS of the results table does not match the user in the user alias that corresponds to the LHS of the results table. For example, for IP address "192.169.67.123" RHS shows that no match is found, and user alias shows a user "John smith".

In an implementation, alias correction engine 244 may provide the alias correction table to a system administrator for identification of one or more user aliases in alias store 252 to one of flag, remove, or correct. In examples, alias correction engine 244 may display the alias correction table to the system administrator via a user interface (for example, administrator interface 282). In an implementation, the system administrator may take action to one of flag, remove, or correct the one or more aliases in alias store 252. In examples, each entry from the alias correction table may be used to identify user aliases in alias store 252 which are incorrect or ambiguous. In FIG. 13, user alias "John Smith" may render ambiguous results.

In examples, alias correction engine 244 may be configured to automatically set a rejected equals true flag, using the alias correction table, for the identified one or more user aliases in alias store 252. In examples, user aliases identified in the alias correction table may be marked with a flag for a soft removal. In an example, the user alias may be marked with a "rejected=true" flag, and then user aliases with "rejected=true" flags are not used in mapping of the security events to users, until or unless the flag is removed. In an implementation, alias correction engine 244 may be configured to track a number of user aliases that are one of flagged, removed, or corrected. If the number of user aliases that are one of flagged, removed, or corrected exceeds a threshold, alias correction engine 244 may cause display of a prompt to the system administrator to take action.

In an implementation, alias correction engine 244 may execute the one or more rules against one or more user records in user metadata store 246. In examples, alias correction engine 244 may execute rules of type "WLAN MAC address" against one or more user records stored in user metadata store 246 that have user metadata which includes an IP address. Examples of the one or more rules that may be executed for alias identifiers of type "WLAN MAC address" are described in Table 8 provided below.

TABLE 8

Examples of alias identifiers for rules of type "WLAN MAC address"

| Rule # | LHS (Security Event Identifier) | RHS (Metadata) |
|---|---|---|
| 4 | 38:E8:DF:01:4D:A9 | <device_WLAN_MACaddress> |
| 4 | FC:08:4A:65:C6:12 | <device_WLAN_MACaddress> |
| 4 | EC:79:49:E0:18:77 | <device_WLAN_MACaddress> |

In examples, alias correction engine 244 may execute rules of type "WLAN MAC address" against one or more user records in user metadata store 246 that have a WLAN MAC address included in the user metadata. In an implementation, alias correction engine 244 may establish a results table as a result of execution of the one or more rules of type "WLAN MAC address".

Figure 14:
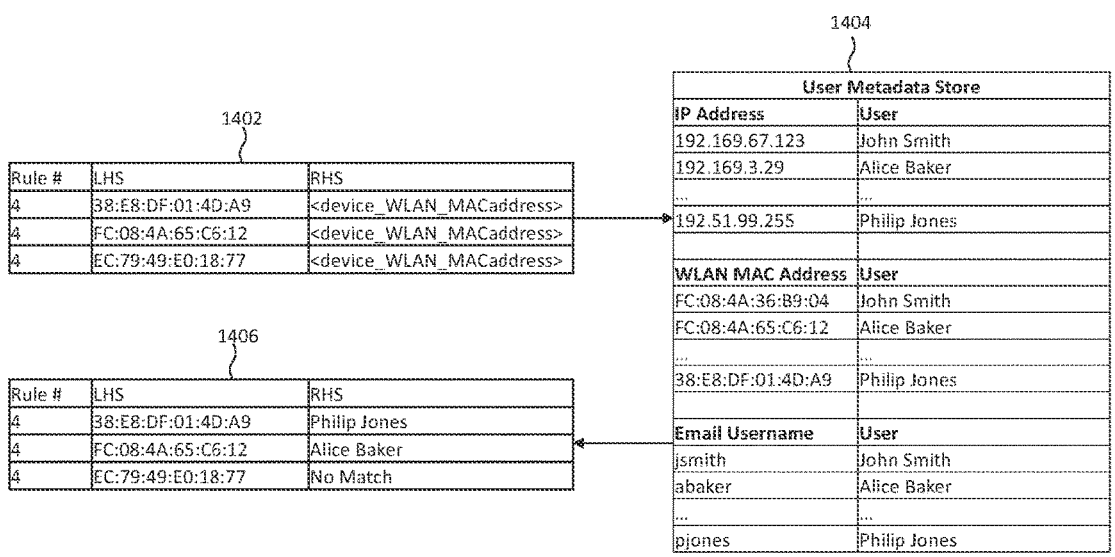
FIG. 14 illustrates an example of a results table of an alias correction process on a rule of type "WLAN MAC address", according to some embodiments.

FIG. 14 illustrates example 1400 of a results table of an alias correction process on a rule of type "WLAN MAC address", according to some embodiments. In the example shown in FIG. 14, alias correction engine 244 may execute rules of type "WLAN MAC address" (represented by reference numeral "1402") against all user records stored in user metadata store 246 (represented by reference numeral "1404"). A results table is established as a result of execution of the rules (represented by reference numeral "1406"). As shown in the results table, WLAN MAC address "38:E8:DF:01:4D:A9" is mapped to the user "Philip Jones", WLAN MAC address "FC:08:4A:65:C6:12" is mapped to the user "Alice Baker", and WLAN MAC address "EC:79:49:E0:18:77" is not mapped to any user.

According to an implementation, alias correction engine 244 may establish an alias correction table responsive to applying the results table against alias store 252. The alias correction table lists aliases where the RHS of the results table does not match the user in the alias that corresponds to the LHS of the results table.

Figure 15:
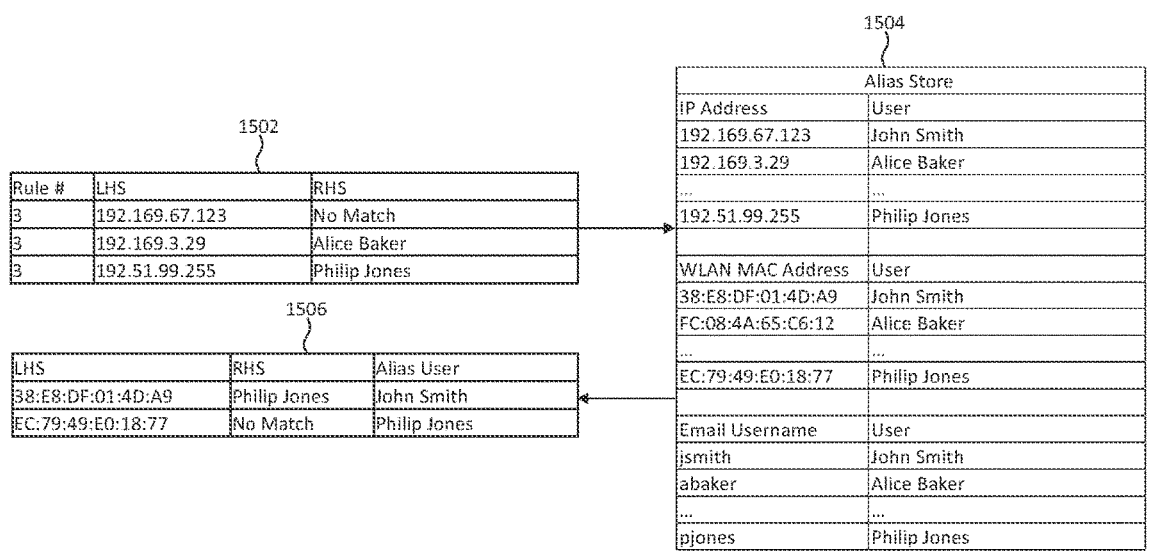
FIG. 15 illustrates an example of creation of an alias correction table for user aliases of type "WLAN MAC address", according to some embodiments.

FIG. 15 illustrates example 1500 of creation of an alias correction table for user aliases of type "WLAN MAC address", according to some embodiments.

As shown in FIG. 15, an alias correction process may be executed where a results table (represented by reference numeral "1502") is applied against alias store 252 (represented by reference numeral "1504"). In examples, the alias correction process may return an alias correction table (represented by reference numeral "1506"). The alias correction table lists user aliases where the RHS of the results table does not match the user in the user alias that corresponds to the LHS of the results table. For example, for WLAN MAC address "38:E8:DF:01:4D:A9", RHS shows the user "Philip Jones" and user alias shows the user "John smith". Further, for WLAN MAC address "EC:79:49:E0:18:77", RHS shows no match and user alias shows the user "Philip Jones".

In examples, each entry from the alias correction table may be then used to identify user aliases in alias store 252 which are incorrect. In the example shown in FIG. 15, either of the user alias "John Smith" and the user alias "Philip Jones" may be incorrect.

In an implementation, alias correction engine 244 may be configured use a trie structure for matching one or more strings in one or more rules to one or more user records. In examples, alias correction engine 244 may establish the trie structure per rule type for an organization. In some implementations, alias correction engine 244 may establish the trie structure for multiple organizations by incorporating an organization identifier as part of the trie structure.

In examples, a trie (which is a digital tree or prefix tree) may be a search structure which may be used for matching specific strings within a set and may be used for the alias correction process. In examples, one trie structure may be constructed per rule type for an organization. Example rules for user alias correction are described in Table 9 provided below.

TABLE 9

Example rules for user alias correction

| Rule # | LHS (Security Event Identifier) | Security Event Identifier/Rule Type | RHS (Metadata) |
|---|---|---|---|
| 1 | username(event) | user name | <firstName> + <lastName> |
| 2 | email_username(event) | email username | <email_username> |
| 3 | IP_address(event) | IP address | <device_IPaddress> |
| 4 | WLAN_MAC(event) | WLAN MAC address | <device_WLAN_MACaddress> |
| 5 | BT_MAC(event) | BT MAC address | <device_BT_MACaddress> |

Figure 16:
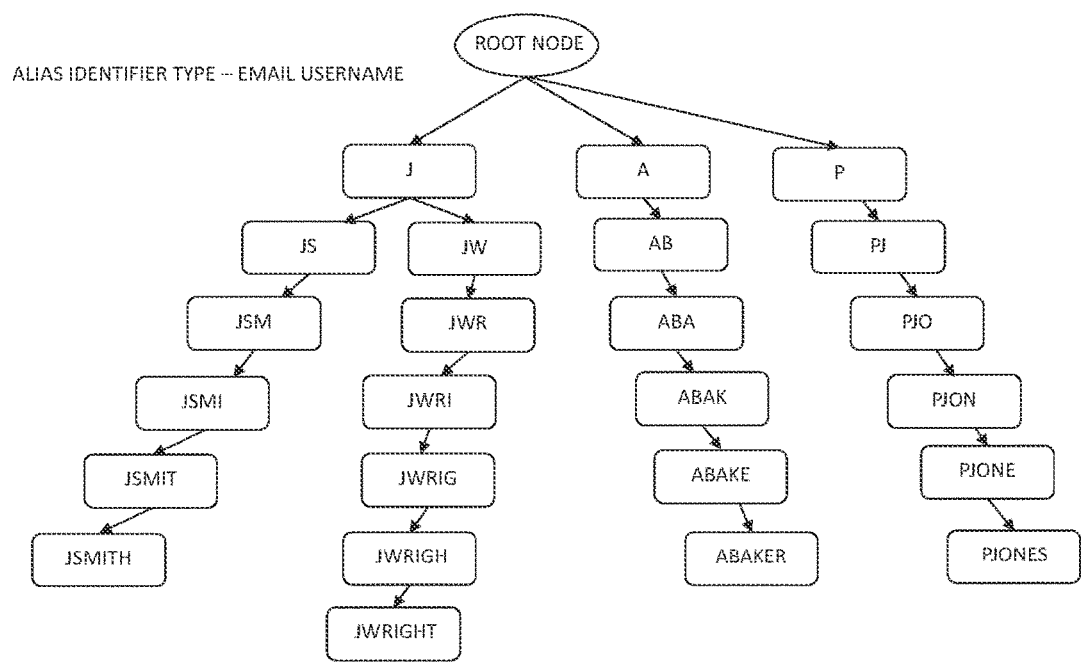
FIG. 16 illustrates an example trie structure for a rule of type "email username", according to some embodiments.

Based on the example provided above, the rules may be "email_username(LHS)=jsmith", "email_username(LHS)=abaker", "email_username(LHS)=jwright", and "email_username(LHS)=pjones". FIG. 16 illustrates example trie structure 1600 for a rule of type "email username", according to some embodiments. In an implementation, for exact rules, during creation of the trie structure for the rule type, if a duplicate string is found for the rule type, then the string may be used as a look up in alias store 252 as the alias identifier and all alias identifiers with this string are removed. In examples, if the duplicate string is found for different rule types, then the string is not used to remove user aliases. In some implementations, for contains rules, the trie structure may be created in a similar manner with the string of the alias identifier. Any user metadata that matches the tris structure may then be checked to determine if it results in a single user. If the number of unique users is greater than one, then a conflict may be found and the user alias with the alias identifier may be removed.

In an example, alias correction engine 244 may track the number of user aliases that are removed to evaluate the number of conflicting user aliases that were created by rules engine 242. In examples, the rule of rules engine 242 that created the user aliases that are removed in the alias correction process may be determined. In examples, if a number of user aliases greater than a threshold are removed in the alias correction process, then the rule may be presented to the system administrator for inspection. In an implementation, the system administrator may delete a removed user alias, or may reinstate a removed alias via the user interface.

In some implementations, alias correction engine 244 may use an Aho-Corasick algorithm to constructs a data structure similar to a trie structure with some additional links. In an implementation, alias correction engine 244 may construct a finite state machine (automaton) in O(mk) time, where k is the size of the used alphabet. In examples, the Aho-Corasick algorithm may be an efficient string matching algorithm that locates all occurrences of a set of keywords within a body of text in a single pass. In examples, the Aho-Corasick algorithm may be a finite automaton-based algorithm that uses a trie data structure to store the keywords and builds a state machine to search for the keywords. In an example, the Aho-Corasick algorithm may start by constructing a trie data structure from the set of keywords. Each node in the trie may represent a prefix of a keyword, and each leaf node may represent a complete keyword. The Aho-Corasick algorithm may then build a state machine by connecting each node in the trie to its fail node, which represents the longest proper suffix of the prefix represented by the node that is also a prefix of some other keyword. In an example, the fail node may be used to redirect the search from a node that does not lead to a keyword to a node that does. In an example, during the search, the Aho-Corasick algorithm may process a text, character by character, thereby updating the state of the machine based on the transition from the current state to its next state in the trie structure. In examples, if the next state represents a keyword, then the keyword may be reported as a match result. In an implementation, the Aho-Corasick algorithm may continue until the Aho-Corasick algorithm has processed the entire text.

Figure 17:
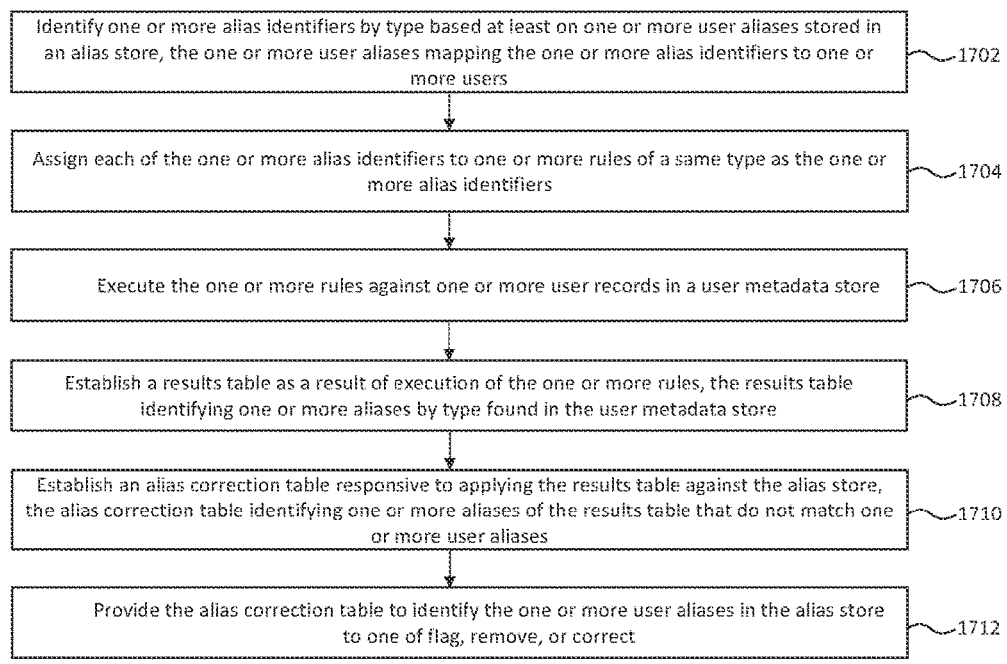
FIG. 17 depicts a flowchart for correcting one or more user aliases, according to some embodiments.

FIG. 17 depict flowchart 1700 for correcting one or more user aliases, according to some embodiments. In a brief overview of an implementation of flowchart 1700, at step 1702, one or more alias identifiers are identified by type based at least on one or more user aliases stored in alias store 252. In examples, the one or more user aliases may map the one or more alias identifiers to one or more users. At step 1704, each of the one or more alias identifiers may be assigned to one or more rules of a same type as the one or more alias. At step 1706, the one or more rules may be executed against one or more user records in user metadata store 246. At step 1708, a results table may be established as a result of execution of the one or more rules. In examples, the results table may identify one or more aliases by type found in user metadata store 246. At step 1710, responsive to applying the results table against alias store 252, an alias correction table may be established. In examples, the alias correction table identifies one or more aliases of the results table that do not match one or more user aliases. At step 1712, the alias correction table may be provided, for example, to a system administrator to identify the one or more user aliases in alias store 252 to one of flag, remove, or correct.

Step 1702 includes identifying one or more alias identifiers by type based at least on one or more user aliases stored in alias store 252. In examples, the one or more user aliases may map the one or more alias identifiers to one or more users. According to an implementation, alias correction engine 244 may be configured to identify one or more alias identifiers by type based at least on one or more user aliases stored in alias store 252. In examples, the type of alias identifiers may include one or more of IP address, MAC address, or email username.

Step 1704 includes assigning each of the one or more alias identifiers to one or more rules of a same type as the one or more alias identifiers. According to an implementation, alias correction engine 244 may be configured to assign each of the one or more alias identifiers to one or more rules of a same type as the one or more alias identifiers. In examples, a rule may include a security event identifier that corresponds to the type of rule. In an example, the rule may have a left-hand-side of the rule that includes the security event identifier and a right-hand-side of the rule that includes user metadata. In examples, the type of rule includes one or more of IP address, MAC address, or email username.

Step 1706 includes executing the one or more rules against one or more user records in user metadata store 246. According to an implementation, alias correction engine 244 may be configured to execute the one or more rules against one or more user records in user metadata store 246.

Step 1708 includes establishing a results table as a result of execution of the one or more rules. In examples, the results table may identify one or more aliases by type found in user metadata store 246. According to an implementation, alias correction engine 244 may be configured to establish a results table as a result of execution of the one or more rules.

Step 1710 includes establishing an alias correction table responsive to applying the results table against alias store 252. In examples, the alias correction table may identify one or more aliases of the results table that do not match one or more user aliases. According to an implementation, alias correction engine 244 may be configured to establish an alias correction table responsive to applying the results table against alias store 252.

Step 1712 includes providing the alias correction table to identify the one or more user aliases in alias store 252 to one of flag, remove, or correct. According to an implementation, alias correction engine 244 may be configured to provide the alias correction table, for example, to a system administrator to identify the one or more user aliases in alias store 252 to one of flag, remove, or correct. In some implementations, alias correction engine 244 may automatically set a rejected equals true flag, using the alias correction table, for the identified one or more user aliases in alias store 252. According to an implementation, alias correction engine 244 may display the alias correction table to the system administrator via a user interface (for example, administrator interface 282) from which the system administrator can take action to one of flag, remove, or correct the one or more aliases in alias store 252. In some implementations, alias correction engine 244 may track a number of user aliases that are one of flagged, removed, or corrected. If the number exceeds a threshold, then alias correction engine 244 may cause display of a prompt to the system administrator to take action.

According to some embodiments, alias correction engine 244 may use a trie structure for matching one or more strings in one or more rules to one or more user records. In examples, alias correction engine 244 may establish the trie structure per rule type for an organization. In some examples, alias correction engine 244 may establish the trie structure for multiple organizations by incorporating an organization identifier as part of the trie structure.

Figure 18A:
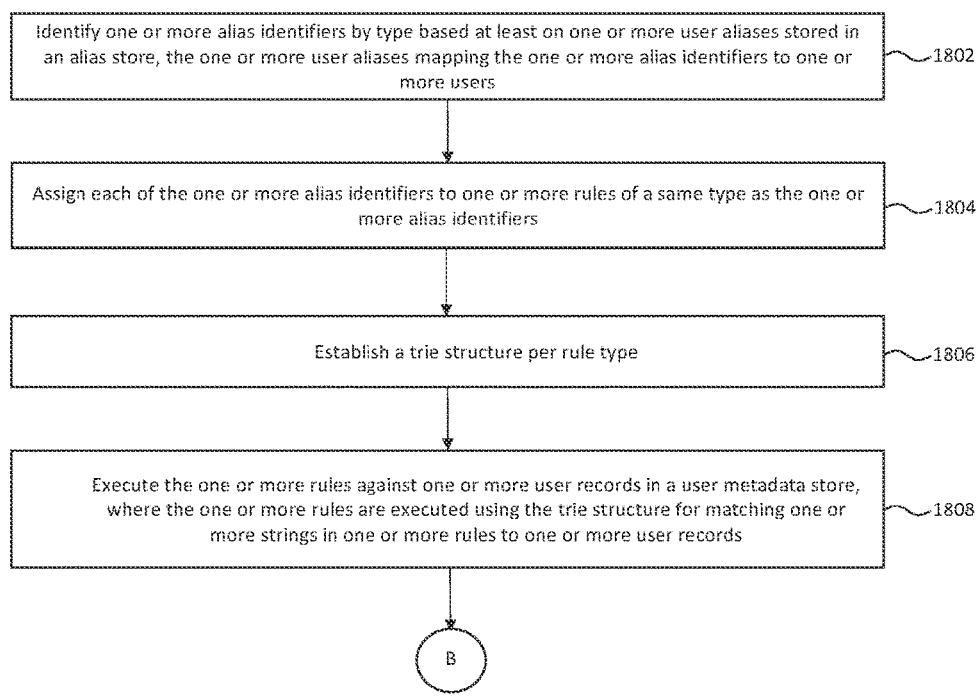
FIG. 18A and FIG. 18B depict a flowchart for establishing an alias correction table for correcting one or more user aliases, according to some embodiments.
Figure 18B:
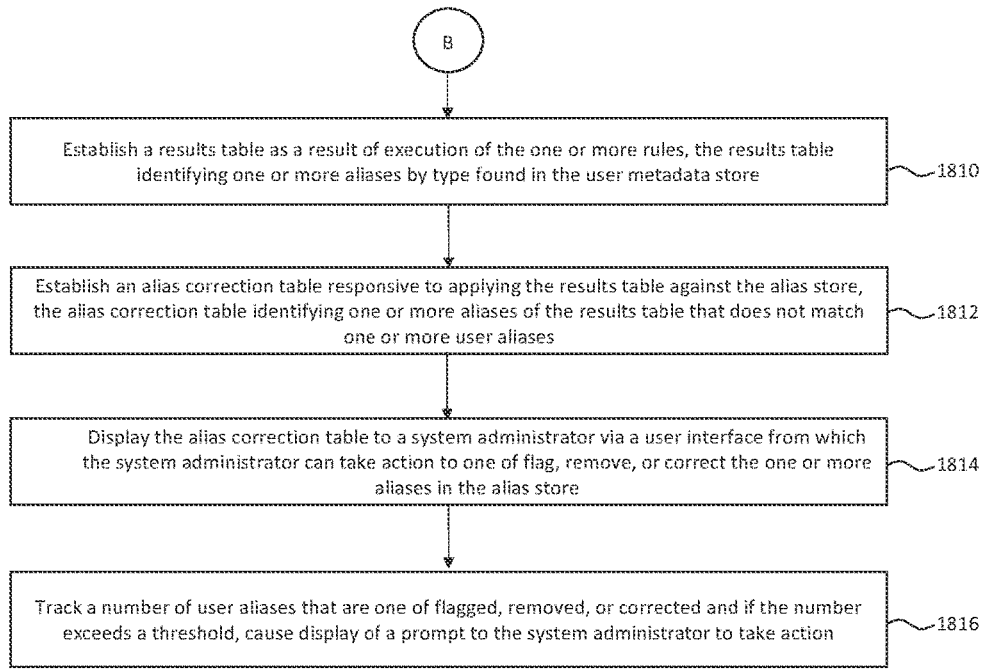

FIG. 18A and FIG. 18B depict flowchart 1800 for establishing an alias correction table for correcting one or more user aliases, according to some embodiments.

In a brief overview of an implementation of flowchart 1800, at step 1802, one or more alias identifiers are identified by type based at least on one or more user aliases stored in alias store 252. In examples, the one or more user aliases may map the one or more alias identifiers to one or more users. At step 1804, each of the one or more alias identifiers may be assigned to one or more rules of a same type as the one or more alias. At step 1806, a trie structure per rule type is established. At step 1808, the one or more rules may be executed against one or more user records in user metadata store 246. In examples, the one or more rules may be executed using the trie structure for matching one or more strings in one or more rules to one or more user records. At step 1810, a results table may be established as a result of execution of the one or more rules. In examples, the results table may identify one or more aliases by type found in user metadata store 246. At step 1812, responsive to applying the results table against alias store 252, an alias correction table may be established. In examples, the alias correction table may identify one or more aliases of the results table that do not match one or more user aliases. At step 1814, the alias correction table may be displayed to a system administrator via a user interface (for example, administrator interface 282) from which the system administrator can take action to one of flag, remove, or correct the one or more aliases in alias store 252. At step 1816, a number of user aliases that are one of flagged, removed, or corrected may be tracked. If the number exceeds a threshold, display of a prompt may be caused to the system administrator to take action.

Step 1802 includes identifying one or more alias identifiers by type based at least on one or more user aliases stored in alias store 252. In examples, the one or more user aliases may map the one or more alias identifiers to one or more users. According to an implementation, alias correction engine 244 may be configured to identify one or more alias identifiers by type based at least on one or more user aliases stored in alias store 252. In examples, the type of alias identifiers may include one or more of IP address, MAC address, or email username.

Step 1804 includes assigning each of the one or more alias identifiers to one or more rules of a same type as the one or more alias identifiers. According to an implementation, alias correction engine 244 may be configured to assign each of the one or more alias identifiers to one or more rules of a same type as the one or more alias identifiers. In examples, a rule may include a security event identifier that corresponds to the type of rule. In an example, the rule may have a left-hand-side of the rule that includes the security event identifier and a right-hand-side of the rule that includes user metadata. In examples, the type of rule includes one or more of IP address, MAC address, or email username.

Step 1806 includes establishing a trie structure per rule type. According to an implementation, alias correction engine 244 may be configured to establish the trie structure per rule type. Step 1808 includes executing the one or more rules against one or more user records in user metadata store 246. In examples, the one or more rules may be executed using the trie structure for matching one or more strings in one or more rules to one or more user records. According to an implementation, alias correction engine 244 may be configured to execute the one or more rules against one or more user records in user metadata store 246 using the trie structure for matching one or more strings in one or more rules to one or more user records.

Step 1810 includes establishing a results table as a result of execution of the one or more rules. In examples, the results table may identify one or more aliases by type found in user metadata store 246. According to an implementation, alias correction engine 244 may be configured to establish a results table as a result of execution of the one or more rules.

Step 1812 includes establishing an alias correction table responsive to applying the results table against alias store 252. In examples, the alias correction table may identify one or more aliases of the results table that do not match one or more user aliases. According to an implementation, alias correction engine 244 may be configured to establish an alias correction table responsive to applying the results table against alias store 252.

Step 1814 includes displaying the alias correction table to a system administrator via a user interface from which the system administrator can take action to one of flag, remove, or correct the one or more aliases in alias store 252. According to an implementation, alias correction engine 244 may display the alias correction table to the system administrator via the user interface from which the system administrator can take action to one of flag, remove, or correct the one or more aliases in alias store 252.

Step 1816 includes tracking a number of user aliases that are one of flagged, removed, or corrected and if the number exceeds a threshold, cause display of a prompt to the system administrator to take action. According to an implementation, alias correction engine 244 may track a number of user aliases that are one of flagged, removed, or corrected. If the number exceeds a threshold, then alias correction engine 244 may cause display of a prompt to the system administrator to take action.

The systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMS, RAMS, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method for correcting one or more user aliases, the method comprising:
    identifying, by one or more processors, one or more alias identifiers by type based at least on one or more user aliases stored in an alias store, the one or more user aliases mapping the one or more alias identifiers to one or more users;
    assigning, by the one or more processors, each of the one or more alias identifiers to one or more rules of a same type as the one or more alias identifiers;
    executing, by the one or more processors, the one or more rules against one or more user records in a user metadata store;
    establishing, by the one or more processors, a results table as a result of execution of the one or more rules, the results table identifying one or more aliases by type found in the user metadata store;
    establishing, by the one or more processors, an alias correction table responsive to applying the results table against the alias store, the alias correction table identifying one or more aliases of the results table that do not match one or more user aliases; and
    providing, by the one or more processors, the alias correction table to identify the one or more user aliases in the alias store to one of flag, remove, or correct.

2. The method of claim 1, further comprising automatically setting a rejected equals true flag, by the one or more processors using the alias correction table, for the identified one or more user aliases in the alias store.

3. The method of claim 1, further comprising displaying, by the one or more processors, the alias correction table to a system administrator via a user interface from which the system administrator can take action to one of flag, remove, or correct the one or more aliases in the alias store.

4. The method of claim 1, wherein the type of alias identifiers comprises one or more of the following: internet protocol (IP) address, media access control (MAC) address or email username.

5. The method of claim 1, wherein the type of rule comprises one or more of the following: internet protocol (IP) address, media access control (MAC) address or email username.

6. The method of claim 1, wherein the rule comprises a security event identifier that corresponds to the type of rule.

7. The method of claim 6, wherein the rule has a left-hand-side of the rule that comprises the security event identifier and a right-hand-side of the rule that comprises user metadata.

8. The method of claim 1, further comprising using, by the one or more processors, a trie structure for matching one or more strings in one or more rules to one or more user records.

9. The method of claim 8, further comprising establishing, by the one or more processors, the trie structure per rule type for an organization.

10. The method of claim 1, further comprising establishing, by the one or more processors, the trie structure for multiple organizations by incorporating an organization identifier as part of the trie structure.

11. The method of claim 1, further comprising tracking, by the one or more processors, a number of user aliases that are one of flagged, removed, or corrected and if the number exceeds a threshold, cause display of a prompt to a system administrator to take action.

12. A system for correcting one or more user aliases, the system comprising:
    one or more processors, coupled to memory, and configured to:
        identify one or more alias identifiers by type based at least on one or more user aliases stored in an alias store, the one or more user aliases mapping the one or more alias identifiers to one or more users;

assign each of the one or more alias identifiers to one or more rules of a same type as the one or more alias identifiers;

execute the one or more rules against one or more user records in a user metadata store;

establish a results table as a result of execution of the one or more rules, the results table identifying one or more aliases by type found in the user metadata store;

establish an alias correction table responsive to applying the results table against the alias store, the alias correction table identifying one or more aliases of the results table that do not match one or more user aliases; and provide the alias correction table to identify the one or more user aliases in the alias store to one of flag, remove, or correct.

13. The system of claim 12, wherein the one or more processors are further configured to automatically set a rejected equals true flag, using the alias correction table, for the identified one or more user aliases in the alias store.

14. The system of claim 12, wherein the one or more processors are further configured to display the alias correction table to a system administrator via a user interface from which the system administrator can take action to one of flag, remove, or correct the one or more aliases in the alias store.

15. The system of claim 12, wherein the type of alias identifiers comprises one or more of the following: internet protocol (IP) address, media access control (MAC) address or email username.

16. The system of claim 12, wherein the type of rule comprises one or more of the following: internet protocol (IP) address, media access control (MAC) address or email username.

17. The system of claim 12, wherein the rule comprises a security event identifier that corresponds to the type of rule.

18. The system of claim 17, wherein the rule has a left-hand-side of the rule that comprises the security event identifier and a right-hand-side of the rule that comprises user metadata.

19. The system of claim 12, wherein the one or more processors are further configured use a trie structure for matching one or more strings in one or more rules to one or more user records.

20. The system of claim 19, wherein the one or more processors are further configured to establish, the trie structure per rule type for an organization.

21. The system of claim 12, wherein the one or more processors are further configured to establish the trie structure for multiple organizations by incorporating an organization identifier as part of the trie structure.

22. The system of claim 12, wherein the one or more processors are further configured to track a number of user aliases that are one of flagged, removed, or corrected and if the number exceeds a threshold, cause display of a prompt to a system administrator to take action.

* * * * *